United States Patent
Ichiyama et al.

(10) Patent No.: US 10,341,525 B2
(45) Date of Patent: Jul. 2, 2019

(54) IMAGE FORMING SYSTEM, COMMUNICATION TERMINAL, AND NON-TRANSITORY COMPUTER-READABLE STORAGE MEDIUM

(71) Applicant: Konica Minolta, Inc., Tokyo (JP)

(72) Inventors: Shohei Ichiyama, Toyokawa (JP); Takeshi Hibino, Toyokawa (JP); Hideyuki Hashimoto, Toyokawa (JP); Yuji Kawamura, Toyokawa (JP); Yukina Hisada, Hachioji (JP)

(73) Assignee: Konica Minolta, Inc. (JP)

( * ) Notice: Subject to any disclaimer, the term of this patent is extended or adjusted under 35 U.S.C. 154(b) by 0 days.

(21) Appl. No.: 15/266,047

(22) Filed: Sep. 15, 2016

(65) Prior Publication Data

US 2017/0085744 A1 Mar. 23, 2017

(30) Foreign Application Priority Data

Sep. 18, 2015 (JP) ................................ 2015-184777

(51) Int. Cl.
*H04N 1/32* (2006.01)
*H04N 1/327* (2006.01)
*H04N 1/00* (2006.01)

(52) U.S. Cl.
CPC ..... *H04N 1/32593* (2013.01); *H04N 1/00315* (2013.01); *H04N 1/00347* (2013.01); *H04N 1/32776* (2013.01); *H04N 2201/0017* (2013.01); *H04N 2201/0039* (2013.01); *H04N 2201/0055* (2013.01); *H04N 2201/0094* (2013.01)

(58) Field of Classification Search
CPC ........... H04N 1/32593; H04N 1/00315; H04N 1/00347; H04N 1/32776; H04N 2201/0017; H04N 2201/0039; H04N 2201/0055; H04N 2201/0094
See application file for complete search history.

(56) References Cited

U.S. PATENT DOCUMENTS

2007/0256020 A1* 11/2007 Haga ................... H04N 1/4406
   715/741
2016/0219184 A1* 7/2016 Ohmiya ............ H04N 1/00204

FOREIGN PATENT DOCUMENTS

| JP | 2007-299040 A | 11/2007 |
|----|---------------|---------|
| JP | 2009-060356 A | 3/2009  |
| JP | 2012-061669 A | 3/2012  |

(Continued)

OTHER PUBLICATIONS

Japan Patent Application No. 2015-184777; Notice of Grounds of Rejection; dated Nov. 7, 2017; 7 pages.

*Primary Examiner* — Iriana Cruz
(74) *Attorney, Agent, or Firm* — BakerHostetler

(57) ABSTRACT

The image forming system includes an image forming apparatus and a communication terminal. When it is detected that an operation is being performed onto an input unit of the image forming apparatus while the image forming apparatus is connected to the communication terminal, the image forming apparatus is configured to perform a first notification to notify the communication terminal that an operation is being performed onto the input unit. When the image forming apparatus performs the first notification, the communication terminal is configured to perform a second notification corresponding to the first notification in the communication terminal.

18 Claims, 25 Drawing Sheets

(56) References Cited

FOREIGN PATENT DOCUMENTS

| JP | 2013-157653 A | 8/2013 |
| JP | 2014094545 A | 5/2014 |
| JP | 2015-072546 A | 4/2015 |

\* cited by examiner

FIG.21

| MACHINE INFORMATION | OPERATION STATE |
|---|---|
| MFP_A | CURRENTLY OPERATED |
| MFP_B | — |
| MFP_C | CURRENTLY OPERATED |
| MFP_D | CURRENTLY OPERATED |

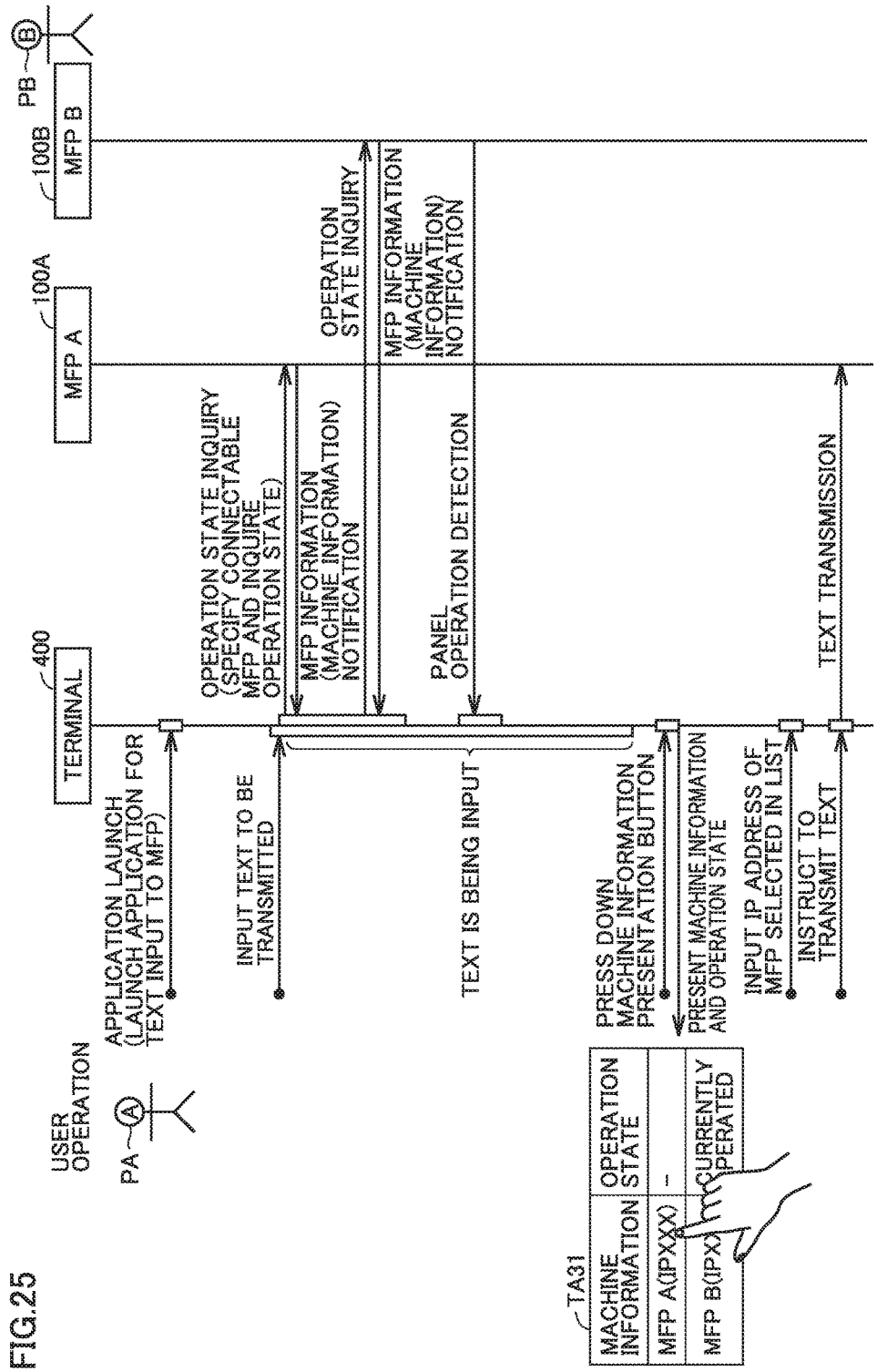

IMAGE FORMING SYSTEM, COMMUNICATION TERMINAL, AND NON-TRANSITORY COMPUTER-READABLE STORAGE MEDIUM

CROSS-REFERENCE TO RELATED APPLICATIONS

This application is entitled to and claims the benefit of Japanese Patent Application No. 2015-184777 filed with the Japan Patent Office on Sep. 18, 2015, the entire contents of which is hereby incorporated by reference.

BACKGROUND OF THE INVENTION

Field of the Invention

The present disclosure relates to an image forming system, a communication terminal, and a non-transitory computer-readable storage medium, in particular, an image forming system and a communication terminal to accept input of information to an image forming apparatus through an operation onto the communication terminal capable of communicating with the image forming apparatus, and a non-transitory computer-readable storage medium storing a program executed by one or more processors of the communication terminal.

Description of the Related Art

Conventionally, a technique has been proposed to remotely control an image forming apparatus using a communication terminal in an image forming system. For example, Japanese Laid-Open Patent Publication No. 2014-94545 discloses an image forming apparatus configured to perform printing in response to a printing instruction from a mobile terminal. The image forming apparatus is configured not to execute the printing instruction from the mobile terminal if a user who has logged in to the image forming apparatus does not coincide with the identifier of the user of the mobile terminal.

On the other hand, in some recent image forming systems, a communication terminal is employed as not only a remote control device but also an extensive input device of the image forming apparatus. In such a case, if a user of the image forming apparatus is different from a user of the communication terminal, attention needs to be paid as to whether information input into the communication terminal should be transmitted to the image forming apparatus, although a printing process of the image forming apparatus does not necessarily need to be prohibited as described in Japanese Laid-Open Patent Publication No. 2014-94545.

SUMMARY OF THE INVENTION

In consideration of the techniques above, it is required to appropriately check whether to transmit information when a user transmits the information to an image forming apparatus from a communication terminal in an image forming system.

An image forming system according to an aspect of the present disclosure includes an image forming apparatus and a communication terminal. The communication terminal includes: a first input unit configured to accept input of (i) information for specifying the image forming apparatus and (ii) information to be transmitted to the image forming apparatus; a first communication unit configured to communicate with the image forming apparatus; and a first processor configured to control operations of the first input unit and the first communication unit. The first processor is configured to connect the communication terminal to the image forming apparatus via the first communication unit when the first processor detects that the information to be transmitted to the image forming apparatus is being input into the first input unit. The image forming apparatus includes: a second input unit configured to accept an operation of inputting information to the image forming apparatus; a second communication unit configured to communicate with the communication terminal; and a second processor configured to control operations of the second input unit and the second communication unit. When the second processor detects that an operation is being performed onto the second input unit while the image forming apparatus is connected to the communication terminal, the second processor is configured to perform a first notification to notify the communication terminal that the operation is being performed onto the second input unit. When the first notification is provided from the image forming apparatus, the first processor is configured to perform a second notification corresponding to the first notification in the communication terminal.

A communication terminal according to another aspect of the present disclosure is capable of communicating with an image forming apparatus. The communication terminal includes: an input unit configured to accept input of (i) information for specifying the image forming apparatus and (ii) information to be transmitted to the image forming apparatus; a communication unit configured to communicate with the image forming apparatus; and a processor configured to control operations of the input unit and the communication unit. The processor is configured to connect the communication terminal to the image forming apparatus via the communication unit when the processor detects that the information to be transmitted to the image forming apparatus is being input into the input unit. The processor is configured to notify information corresponding to a notification indicating that an operation is being performed onto the input unit of the image forming apparatus, when receiving the notification from the image forming apparatus while the image forming apparatus is connected to the communication terminal.

A non-transitory computer-readable storage medium according to still another aspect of the present disclosure stores a program causing one or more processors of a communication terminal to perform a communication method. The communication method includes: accepting input of information to be transmitted to an image forming apparatus; detecting that the information to be transmitted to the image forming apparatus is being input; connecting the communication terminal to the image forming apparatus when it is detected that the information to be transmitted to the image forming apparatus is being input; and notifying information corresponding to a notification indicating that an operation is being performed onto an input unit of the image forming apparatus, when receiving the notification from the image forming apparatus while the image forming apparatus is connected to the communication terminal.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 21 shows one exemplary manner of presentation of an operation state of each MFP in the communication terminal.

FIG. 25 shows one exemplary sequence of communication between a communication terminal and an MFP in an image forming system of one embodiment.

DESCRIPTION OF THE PREFERRED EMBODIMENTS

Figure 1:
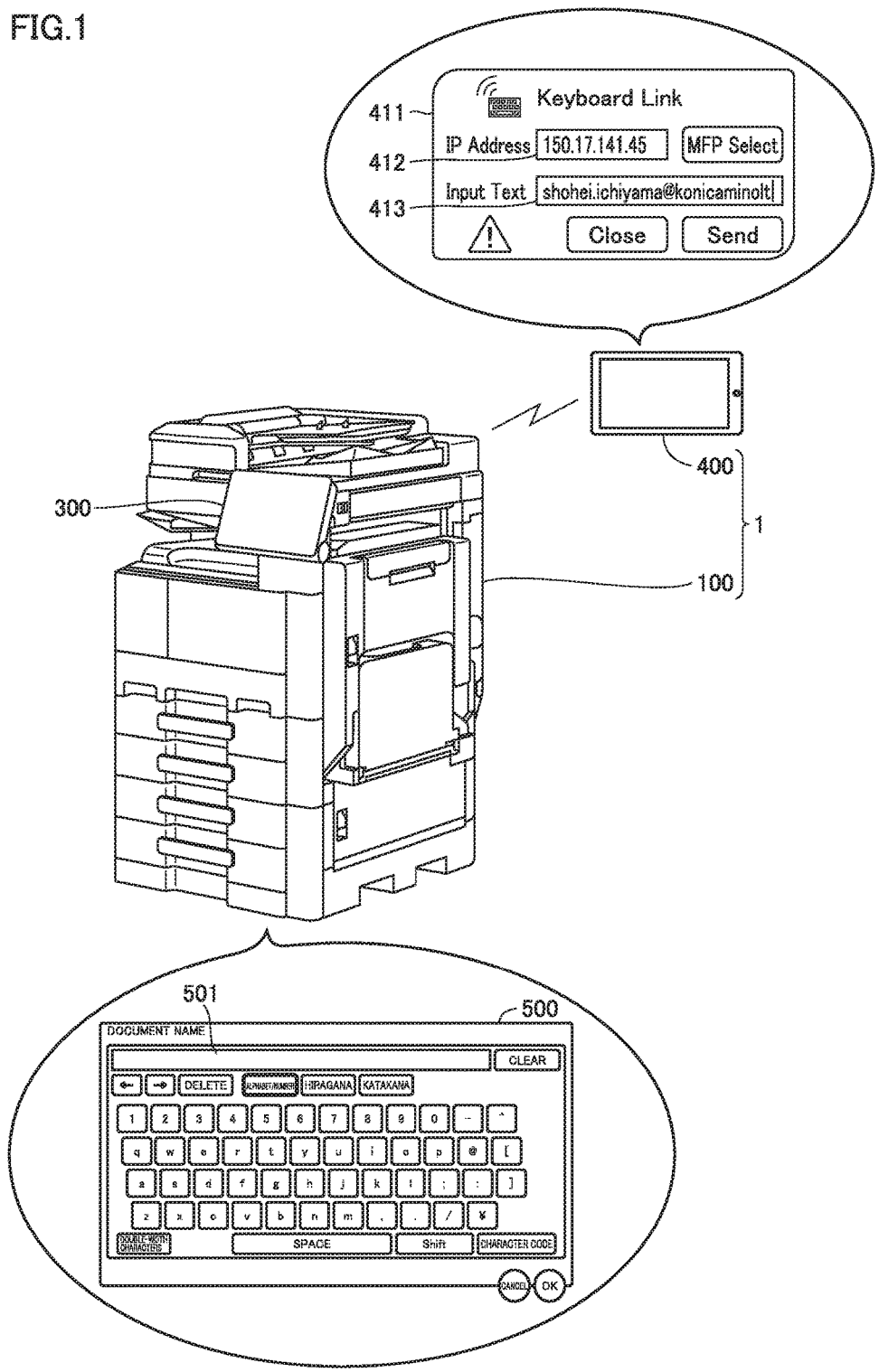
FIG. 1 schematically shows one embodiment of an image forming system.

The following describes embodiments of an image forming system with reference to figures. In the description below, the same reference characters are given to the same parts and components. Their names and functions are also the same. Hence, they are not repeatedly described.

<1. Overview of Disclosure>

FIG. 1 schematically shows one embodiment of an image forming system. As shown in FIG. 1, image forming system 1 includes an MFP 100 serving as an exemplary image forming apparatus, and a communication terminal 400. Communication terminal 400 is implemented by an information communication terminal such as a smartphone, for example.

MFP 100 includes an operation panel 300. Operation panel 300 includes a touch panel (touch panel 320 of FIG. 5 or the like as described below) configured to accept an operation of inputting text or the like. On the touch panel, an input area 501 for inputting text or the like is presented.

Communication terminal 400 functions as a remote input device for the touch panel of MFP 100. In other words, a user can transmit, from communication terminal 400 to MFP 100, information (text or the like) input to a presentation screen of the touch panel. One exemplary presentation screen (screen 410) in communication terminal 400 includes a window 411 having an address input area 412 and an information input area 413.

When text are being input into information input area 413, communication terminal 400 is connected to MFP 100 specified by information (IP (Internet Protocol) address in one embodiment) input in address input area 412. Then, in image forming system 1, MFP 100 transmits, to communication terminal 400, information indicating whether or not the touch panel of MFP 100 is being operated.

It should be noted that the "IP address" input in address input area 412 is one exemplary information for specifying an MFP. For example, when a table associating the name of an MFP on the network with an IP address is stored in communication terminal 400, the name of the MFP may be input into address input area 412. In such a case, in communication terminal 400, the name is converted into the IP address, which is then used for connection to MFP 100.

Figure 2:
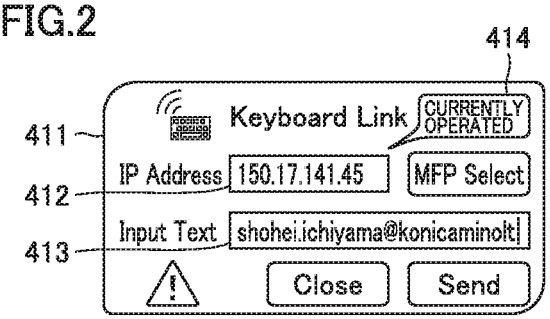
FIG. 2 shows one exemplary presentation indicating that an MFP (Multi-Functional Peripheral) is being used.

FIG. 2 shows exemplary presentation indicating that MFP 100 is being used. When the touch panel of MFP 100 is being operated, communication terminal 400 presents that MFP 100 indicated in address input area 412 is being used (message 414 in window 411) as shown in FIG. 2.

According to one embodiment, when the user of communication terminal 400 sees message 414 of FIG. 2, the user recognizes that another user may be using the apparatus (MFP 100 shown in address input area 412), which is an expected transmission destination to which the information input in information input area 413 is to be transmitted. Accordingly, the user of communication terminal 400 checks a state of use of MFP 100 and changes the address in address input area 412, thereby changing the MFP of the transmission destination. Moreover, the user may not change the MFP of the transmission destination.

<2. Overview of Process>

Figure 3:
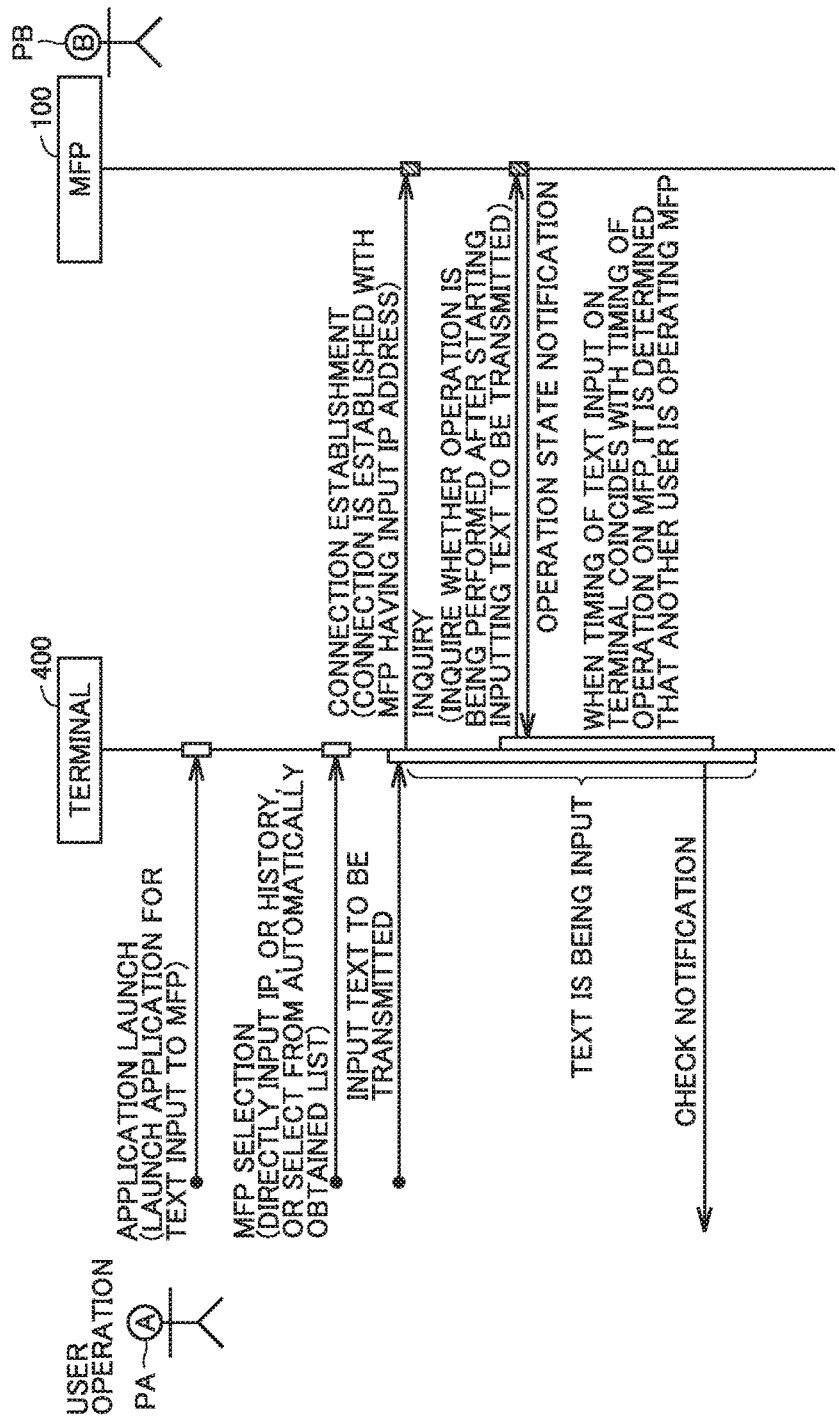
FIG. 3 shows an overview of a process performed between the communication terminal and the MFP in the image forming system according to one embodiment.

FIG. 3 shows an overview of a process performed between communication terminal 400 and MFP 100 in the image forming system according to one embodiment. As shown in FIG. 3, based on an operation of a user PA, communication terminal 400 launches an application for presenting a window including information input area 413 ("APPLICATION LAUNCH" in FIG. 3). The application is implemented by a CPU 401 executing an application program stored in a storage device 403, for example. It should be noted that the program may be stored in a storage medium attachable/detachable to/from communication terminal 400, or may be stored in a storage device on the network.

The application selects an MFP as a transmission destination ("SELECT MFP" in FIG. 3). One exemplary selection of an MFP as a transmission destination is performed in such a manner that the application reads the address of the MFP of the previous information transmission destination. That is, the application selects, as a transmission destination, the MFP specified by the address thus read. In another example, the application accepts input of text to address input area 412. That is, the application selects, as a transmission destination, the MFP specified by the input text. In still another example, selection of an MFP is performed in such a manner that the application obtains the IP address of an MFP through WiFi (Wireless Fidelity) communication or the like. That is, the application selects, as a transmission destination, the MFP specified by the obtained IP address. If the addresses of two or more MFPs are obtained through the WiFi communication or the like, the IP address of one MFP selected by the user from the two or more MFPs may be selected.

Next, the application receives input of text to be transmitted to the MFP ("INPUT TEXT TO BE TRANSMITTED" in FIG. 3). The text is input by user PA operating the touch panel of communication terminal 400. In response to the input of the text, the application establishes connection between communication terminal 400 and MFP 100 selected as described above ("CONNECTION ESTABLISHMENT" in FIG. 3).

In parallel with accepting the input of the text, the application inquires MFP 100 whether or not an operation on operation panel 300 of MFP 100 is being accepted ("INQUIRY" in FIG. 3).

When the inquiry is received from communication terminal 400, MFP 100 notifies the application on communication terminal 400 that an operation has been performed, in response to the operation performed on operation panel 300 ("OPERATION STATE NOTIFICATION" in FIG. 3).

When the notification is received from MFP 100, the application on communication terminal 400 detects that an operation is being performed onto operation panel 300 of MFP 100. Then, on communication terminal 400, the application notifies that MFP 100 is being operated by a user (user PB in FIG. 3) different from the user (user PA in FIG. 3) of communication terminal 400 ("CHECK NOTIFICATION" in FIG. 3).

When the application of communication terminal 400 receives an "operation state notification" from MFP 100 during a period of input of information to information input area 413, the application performs "check notification". In one example of determining whether or not it is now in the period of input, the application uses a timer (timer for input detection) configured to start in accordance with a timing of input to information input area 413. The timer for input detection measures predetermined certain time (for example, 1 minute). When an input operation is performed onto information input area 413, the timer for input detection starts to measure time. When a next input operation is performed onto information input area 413 before the timer for input detection completes the measurement of time for the above-described certain time, the measurement of time by the timer for input detection is reset and the timer for input detection starts to measure time again. When the measurement of time by the timer for input detection is being continued, the application specifies that it is now the period of input of information to information input area 413.

In another example of determining whether or not it is now the period of input, the application uses a predetermined button of communication terminal 400. That is, for example, as the period of input of information to information input area 413, the application specifies a period from an operation on a specific button to another operation thereon.

It should be noted that MFP 100 may be configured to notify communication terminal 400 for every certain period that no operation is performed on operation panel 300. In this case, the application performs the "check notification" under a condition that the notification has not been received for the certain period or longer.

<3. External Appearance of MFP>

Figure 4:
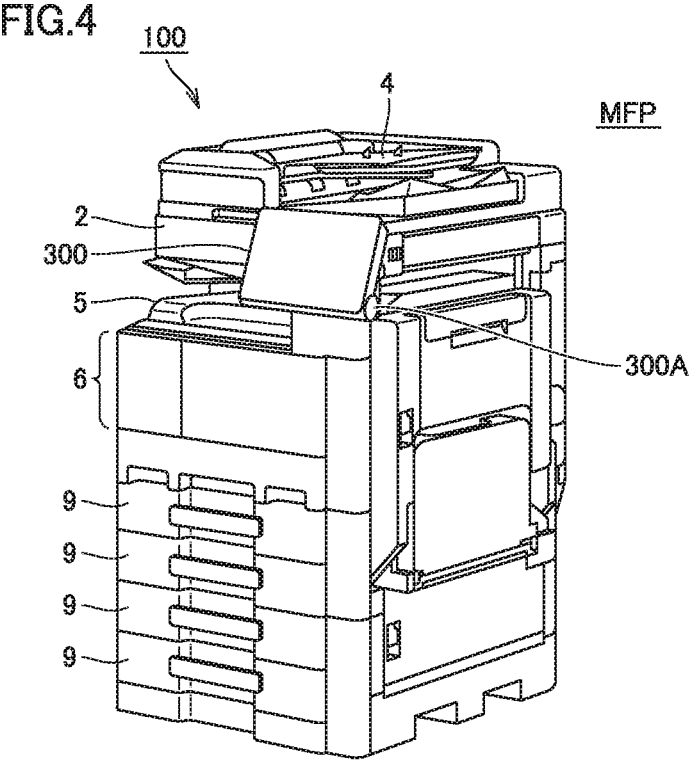
FIG. 4 is a perspective view showing an entire configuration of the MFP.

FIG. 4 is a perspective view showing the entire configuration of MFP 100.

As shown in FIG. 4, MFP 100 includes: an image scanning unit 2 configured to optically read a document to obtain image data; and an image forming unit 6 configured to print an image on a sheet based on the image data. On the upper surface of the main body of MFP 100, a feeder 4 configured to send a document to image scanning unit 2 is provided. In the lower portion of MFP 100, a plurality of sheet supply units 9 configured to supply a printing sheet to image forming unit 6 are provided. In the central portion of MFP 100, a tray 5 is provided to which a printing sheet having an image formed thereon by image forming unit 6 is ejected.

At the front side of the upper portion of the main body of MFP 100, operation panel 300 is attached. Operation panel 300 is rotatably installed on the main body of MFP 100 by way of a hinge 300A.

<4. External Appearance of Operation Panel>

Figure 5:
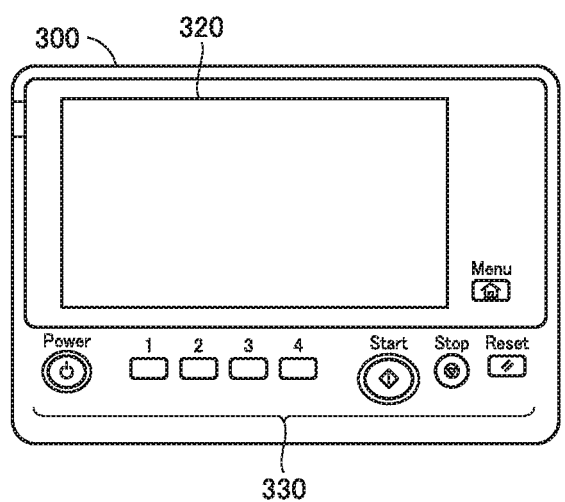
FIG. 5 shows an external appearance of an operation panel.

FIG. 5 shows an external appearance of operation panel 300. Operation panel 300 includes a touch panel 320 and a hard key 330. Touch panel 320 presents information and accepts an input operation for information. For touch panel 320, various types of touch panels may be employed, such as a resistive film type touch panel or a capacitive type touch panel.

In one embodiment, the operation onto operation panel 300 means that hard key 330 or touch panel 320 is operated.

<5. Hardware Configuration of MFP>

Figure 6:
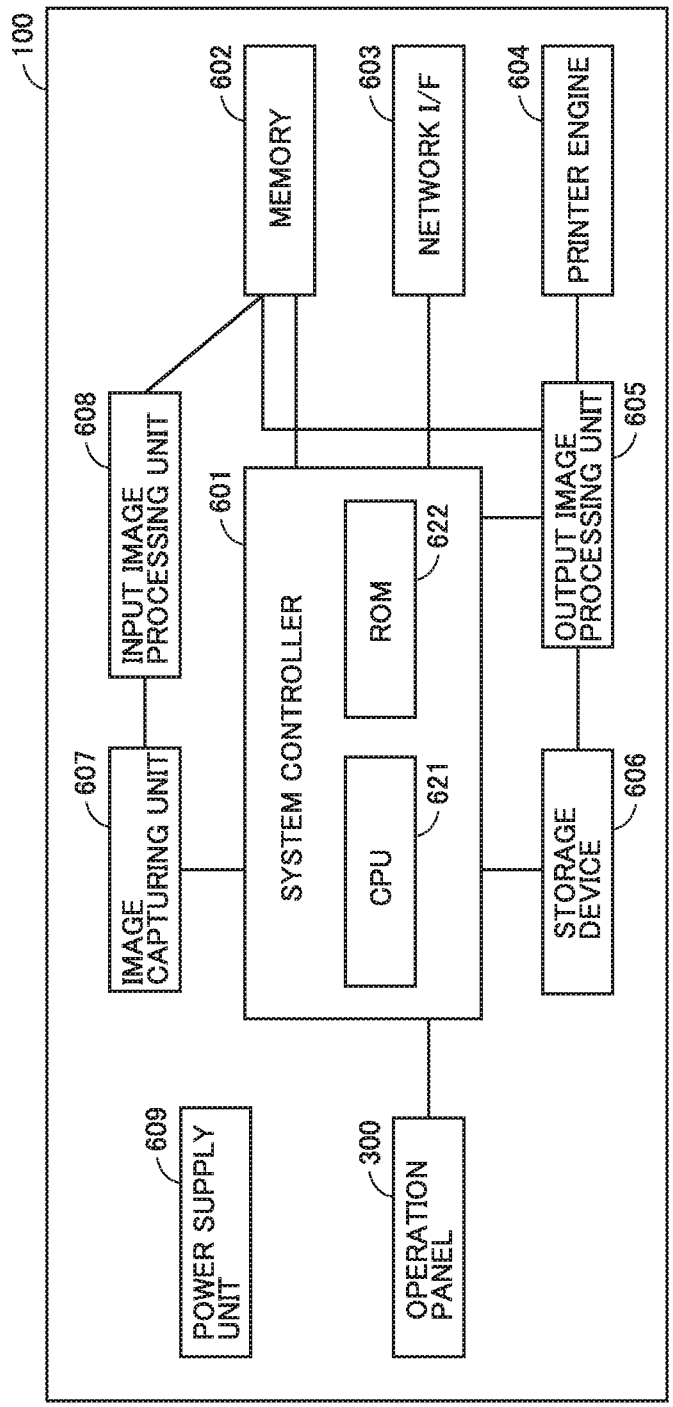
FIG. 6 is a block diagram showing the configuration of the MFP.

FIG. 6 is a block diagram showing the configuration of MFP 100. As shown in FIG. 6, MFP 100 includes a system controller 601, a memory 602, a network interface (I/F) 603, a printer engine 604, an output image processing unit 605, a storage device 606, an image capturing unit 607, an input image processing unit 608, operation panel 300, and a power supply unit 609. For example, system controller 601 is connected, via an internal bus, to memory 602, network I/F 603, printer engine 604, output image processing unit 605, storage device 606, image capturing unit 607, input image processing unit 608, and operation panel 300.

Power supply unit 609 is supplied with power from an external power supply. System controller 601 is configured to control supply of power from power supply unit 609 to each element in MFP 100. For example, when a power button in operation panel 300 is operated, system controller 601 starts supply of power from power supply unit 609 to each element in MFP 100. Then, for example, when the power button in operation panel 300 is operated again, system controller 601 stops the supply of power from power supply unit 609 to each element in MFP 100.

System controller 601 controls the entire MFP 100 in accordance with various jobs such as a scan job, a copy job, a mail transmission job, and a print job. System controller 601 includes a CPU (Central Processing Unit) 621 and a ROM (Read Only Memory) 622.

CPU 621 executes a control program stored in ROM 622. ROM 622 stores (i) various types of programs for control of operations of MFP 100, and (ii) various types of fixed data. CPU 621 performs a predetermined process to read data from memory 602 and write data into memory 602.

Memory 602 is a RAM (Random Access Memory) and is used for temporary storage of data or image data required when CPU 621 executes a control program, for example.

Network I/F 603 communicates with an external device (inclusive of communication terminal 400) via the network in accordance with an instruction from system controller 601. Network I/F 603 is used for communication in accordance with a standard such as Bluetooth®, for example. The communication between network I/F 603 and the external device is implemented in a wireless LAN (Local Area Network), for example. One example of network I/F 603 is a wired LAN interface mainly used for communication with a server or a PC (personal computer). Another example of network I/F 603 is a wireless LAN (such as communication network in accordance with the IEEE802.11 standard) interface mainly used for communication with a mobile terminal or a PC.

Printer engine 604 performs a printing process to a sheet or the like based on printing data processed by output image processing unit 605. Particularly when MFP 100 operates as a printer, printer engine 604 prints an image, whereas when MFP 100 operates as a copying machine, printer engine 604 prints an image read by image capturing unit 607.

For example, when printing an image, output image processing unit 605 performs a conversion process for converting the data format of the image to a data format for printing.

Storage device 606 is, for example, a HDD (Hard Disk Drive), and stores various types of data in connection with the operation of MFP 100. Storage device 606 may further store image data of a screen presented on operation panel 300 of MFP 100.

Image capturing unit 607 reads an image of a document, and outputs it to input image processing unit 608.

When an image is read by image capturing unit 607, input image processing unit 608 performs a conversion process for converting the format of the image data.

In MFP 100, CPU 621 executes an appropriate program to implement an operation of MFP 100 as described in the present specification. The program executed by CPU 621 may be stored in ROM 622 as described above, or may be stored in storage device 606, or may be stored in a storage medium attachable/detachable to/from MFP 100. The storage medium in which the program is stored is a medium storing data in a non-volatile manner, such as a CD-ROM (Compact Disc-Read Only Memory), a DVD-ROM (Digital Versatile Disk-Read Only Memory), a USB (Universal Serial Bus) memory, a memory card, a FD (Flexible Disk), a hard disk, an SSD (Solid State Drive), a magnetic tape, a cassette tape, an MO (Magnetic Optical Disc), an MD (Mini Disc), an IC (Integrated Circuit) card (exclusive of a memory card), an optical card, a mask ROM, an EPROM, or an EEPROM (Electronically Erasable Programmable Read-Only Memory).

It should be noted that the program according to the present disclosure may be configured to invoke necessary modules in a predetermined sequence at predetermined timings among program modules provided as a part of the operating system (OS) of the computer and execute them. In that case, the modules are not included in the program and the process is performed in cooperation with the OS. Such a program including no modules can be also included in the program according to the present disclosure.

Moreover, the program according to the present disclosure may be incorporated in a portion of another program and may be provided. Also in that case, the modules included in the other program are not included in the program and the process is performed in cooperation with the other program. The program thus incorporated in the other program can be also included in the program according to the present disclosure.

A program product provided is installed in a program storage unit such as a hard disk, and is executed. It should be noted that the program product includes the program itself and a storage medium having the program stored therein.

<6. Configuration of Operation Panel>

Figure 7:
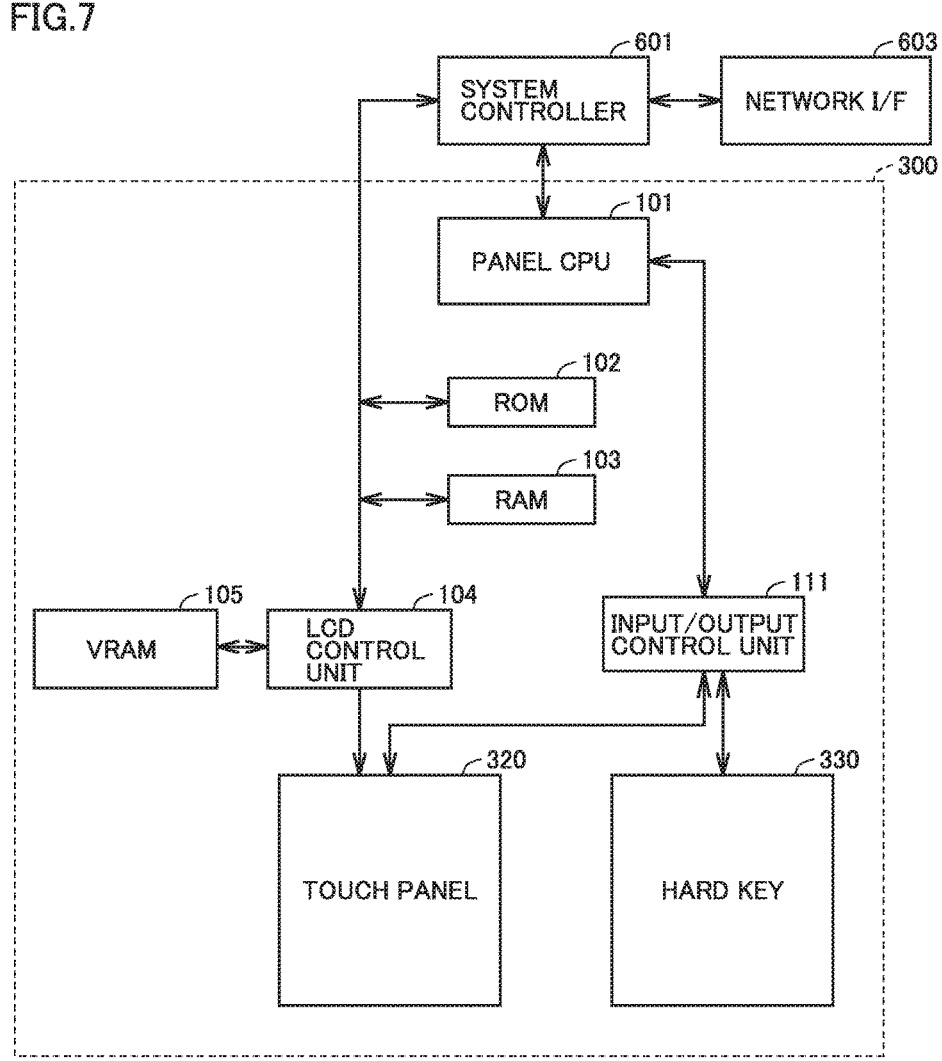
FIG. 7 is a block diagram showing a configuration of the operation panel of the MFP.

FIG. 7 is a block diagram showing a configuration of operation panel 300 of MFP 100. In addition to touch panel 320 and hard key 330 described with reference to FIG. 5 and the like, operation panel 300 includes a panel CPU 101, a ROM 102, a RAM 103, an LCD (Liquid Crystal Display) control unit 104, a VRAM (Video RAM) 105, and an input/output control unit 111.

Panel CPU 101 controls the entire operation panel 300, and communicates with system controller 601 (see FIG. 6) of the main body side of MFP 100.

ROM 102 stores (i) a program for controlling an operation of operation panel 300 and (ii) an image to be presented on touch panel 320. RAM 103 is a work memory of panel CPU 101.

LCD control unit 104 controls presentation on a display (such as a liquid crystal display) included in touch panel 320. LCD control unit 104 controls read/write of VRAM 105. The image stored in ROM 102 is stored into VRAM 105 via LCD control unit 104 by panel CPU 101, is then read, and is then output to touch panel 320.

Touch panel 320 includes a display and a touch sensor. Touch panel 320 specifies a touch position in the touch sensor (or a position in the vicinity of a conductor), and outputs the specified position to input/output control unit 111.

Input/output control unit 111 specifies an item (menu, function, or the like) selected by a touch operation based on (i) a presented content on the display and (ii) a touch position output from touch panel 320, and outputs it to panel CPU 101. Input/output control unit 111 may be implemented as one function of the same processor as the processor constituting panel CPU 101. Moreover, the process shown in the present embodiment may be performed by a single processor or may be performed by a plurality of processors.

Hard key 330 includes various keys, such as a start key, a ten key, and a panel reset key.

In addition to the above elements, operation panel 300 may include various elements, such as an LED (Light Emitting Diode) indicating a state of MFP 100, and a buzzer for notification.

The input operation to hard key 330 and touch panel 320 is transmitted to system controller 601 via input/output control unit 111 and panel CPU 101 as required. Accordingly, the main body of MFP 100 is operated based on the input operation onto operation panel 300. For example, when the start key in hard key 330 is pressed down, information indicating that the start key is pressed down is transmitted to system control unit 100 of the main body of the MFP via hard key 330, input/output control unit 111, and panel CPU 101, thereby starting a series of copying operations.

As shown in FIG. 3 as "OPERATION STATE NOTIFICATION", when touch panel 320 or hard key 330 is operated, MFP 100 notifies communication terminal 400 that the operation has been performed. This notification is implemented as follows, for example. That is, when each of touch panel 320 and hard key 330 is operated, each of touch panel 320 and hard key 330 transmits information corresponding to the operation to system controller 601 via input/output control unit 111 and panel CPU 101. When the information is received, system controller 601 transmits, as the "notification" to communication terminal 400, the information indicating that operation panel 300 is being operated.

<7. Configuration of Communication Terminal>

Figure 8:
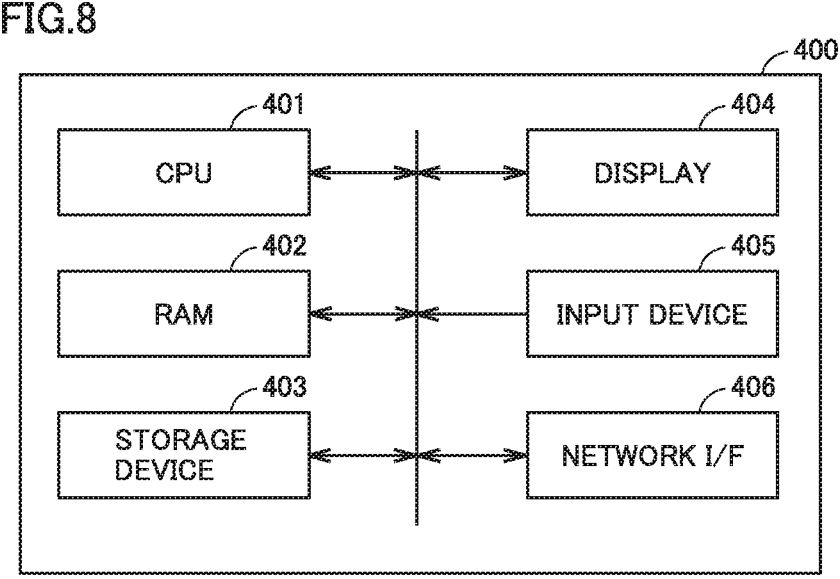
FIG. 8 is a block diagram showing a hardware configuration of the communication terminal.

FIG. 8 is a block diagram showing a hardware configuration of communication terminal 400. As shown in FIG. 8, as main components, communication terminal 400 includes CPU 401, a RAM 402, a storage device 403, a display 404, an input device 405, and a network I/F 406. CPU 401, RAM 402, storage device 403, display 404, input device 405, and network I/F 406 are connected to one another via an internal bus.

CPU 401 is one exemplary calculation device configured to perform a process for controlling an entire operation of communication terminal 400.

RAM 402 functions as a work area upon executing a process in CPU 401.

Storage device 403 stores (i) data of various types of programs such as an OS (Operating System) program and an application program executed by CPU 401, and (ii) data used for execution of these programs. Examples of storage device 403 include a medium for storing data in a nonvolatile manner such as an EEPROM. Moreover, a program downloaded via the network may be installed in storage device 403. It should be noted that CPU 401 may implement a function described in the present specification by executing a program stored in (i) a storage medium attachable/detachable to/from the main body of communication terminal 400 and/or (ii) a storage medium on the network.

Display 404 is a display device for displaying an image indicating a result of process of the program executed by CPU 401.

Input device 405 is an exemplary input device for inputting information to communication terminal 400 such as input of an instruction about a process of an application currently executed. It should be noted that another exemplary input device included in communication terminal 400 is a touch sensor provided on display 404.

Network I/F 406 communicates with an external device such as MFP 100 in accordance with a standard such as Bluetooth, for example.

<8. Specific Example of Screen>

Figure 9:
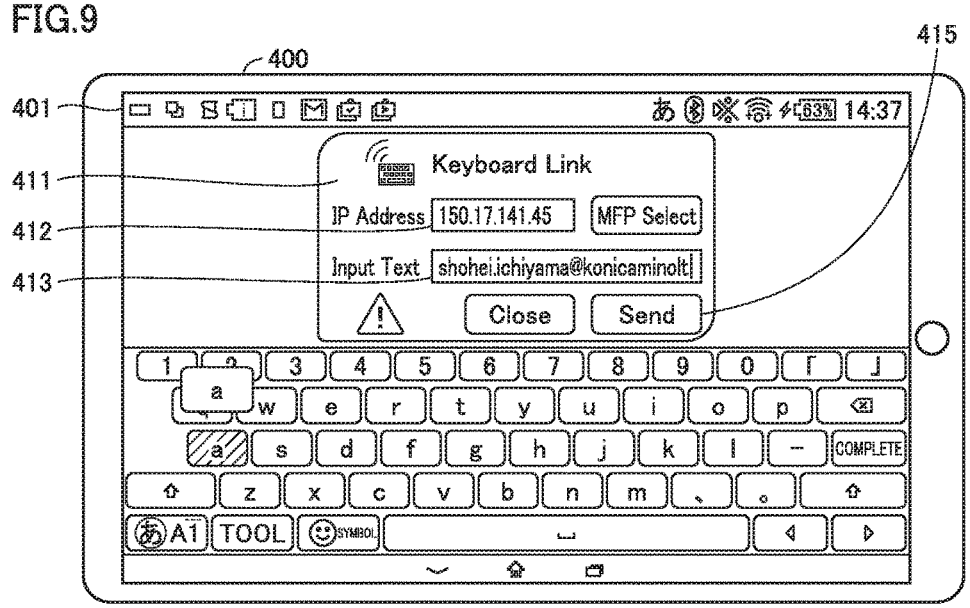
FIG. 9 shows a specific example of a screen presented on a display of the communication terminal.
Figure 10:
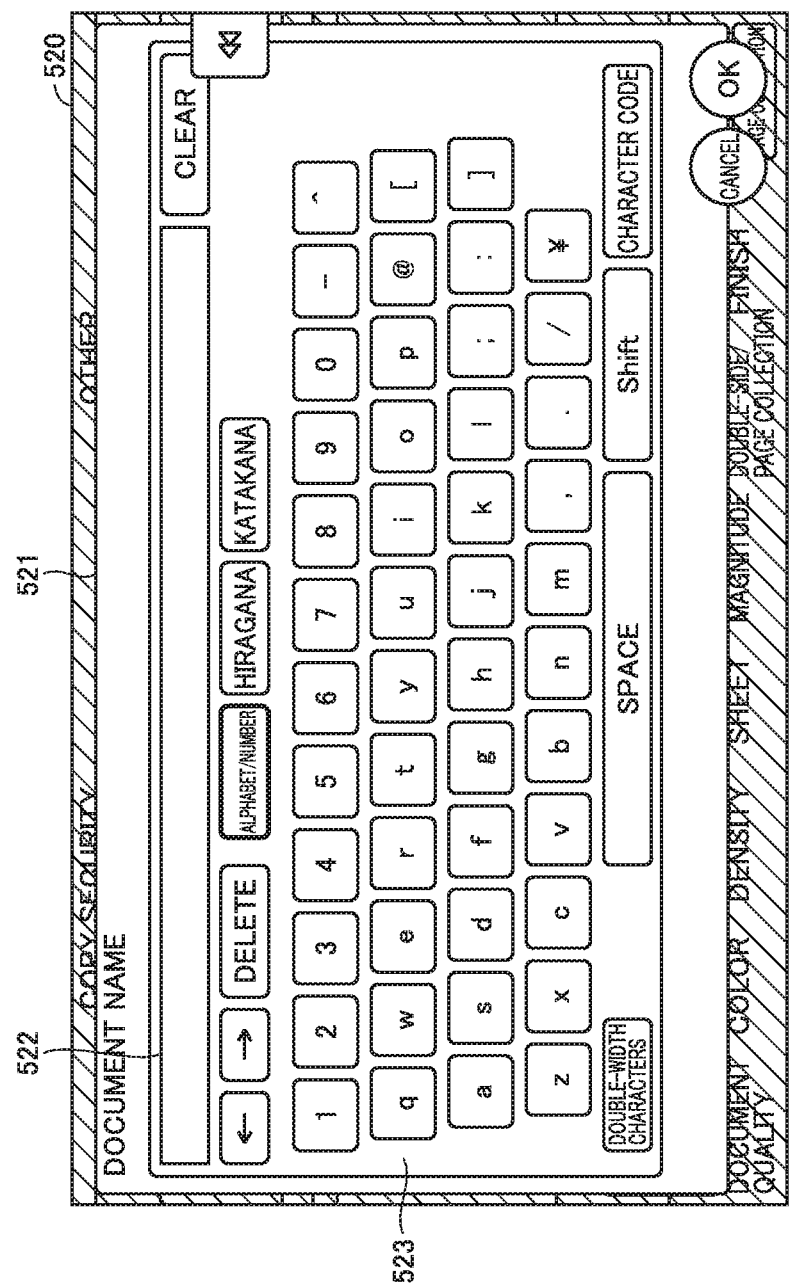
FIG. 10 shows a specific example of a screen presented on a touch panel of the MFP.
Figure 11:
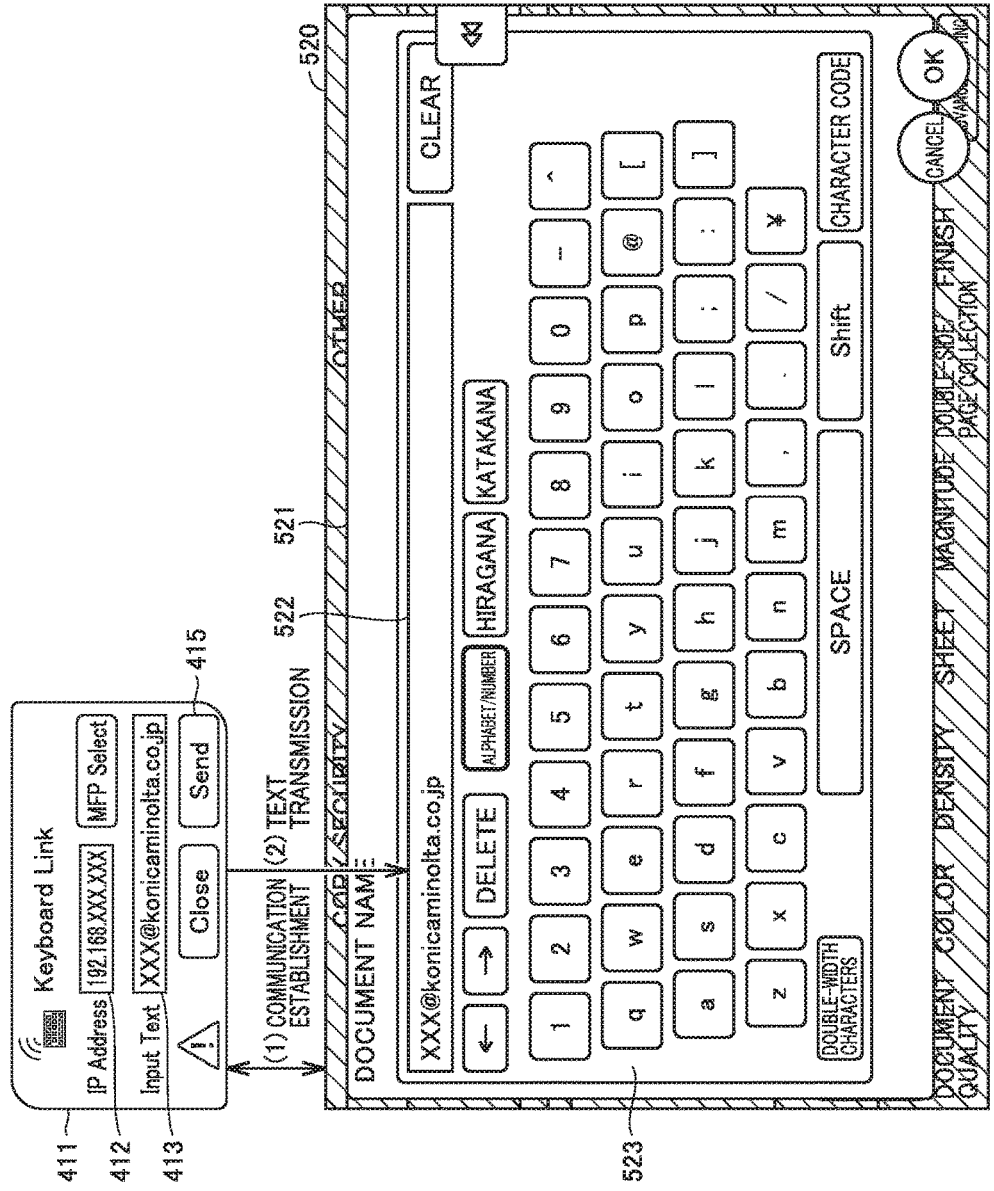
FIG. 11 schematically shows a process of accepting information transmitted from the communication terminal, as information input into an input area of the MFP.

Next, with reference to FIG. 9 to FIG. 11, the following describes specific examples of screens presented in MFP 100 and communication terminal 400 when performing a process as shown in FIG. 3.

FIG. 9 shows a specific example of a screen presented on display 404 of communication terminal 400. Screen 410 of FIG. 9 includes a window 411. Window 411 includes address input area 412, information input area 413, and sending button 415. Screen 410 further includes a software keyboard 420.

As a target to which information is to be input, the user selects address input area 412 or information input area 413. CPU 401 accepts information (for example, text string) input to software keyboard 420, as information input to selected one of address input area 412 and information input area 413. Moreover, when sending button 415 is operated, CPU 401 transmits the information input in information input area 413 to an apparatus (MFP 100 in the present embodiment) specified by the information input in address input area 412.

FIG. 10 shows a specific example of a screen presented on touch panel 320 of MFP 100. Screen 520 of FIG. 10 includes a window 521. Window 521 includes an input area 522 and a software keyboard 523. Input/output control unit 111 accepts information (for example, text string) input to software keyboard 523, as information input to input area 522.

Moreover, input/output control unit 111 accepts, as the information input to input area 522, information transmitted from communication terminal 400. FIG. 11 schematically shows a process in which information transmitted from communication terminal 400 is accepted as information input to input area 522 of MFP 100.

FIG. 11 shows (i) window 411 presented in communication terminal 400, and (ii) window 521 presented in MFP 100. In image forming system 1 of one embodiment, when information starts to be input into information input area 413 of window 411, connection is established between communication terminal 400 and MFP 100 ("(1) COMMUNICATION ESTABLISHMENT" in FIG. 11).

Then, when sending button 415 in window 411 is operated, CPU 401 of communication terminal 400 transmits, to MFP 100, the information input in information input area 413 ("(2) TEXT TRANSMISSION" in FIG. 11).

In MFP 100, when the information is transmitted, system controller 601 (see FIG. 7) sends the information to input/output control unit 111 via panel CPU 101. Accordingly, input/output control unit 111 handles the information as information input in input area 521, and presents the information in input area 521.

<9. Flow of Process>

Figure 12:
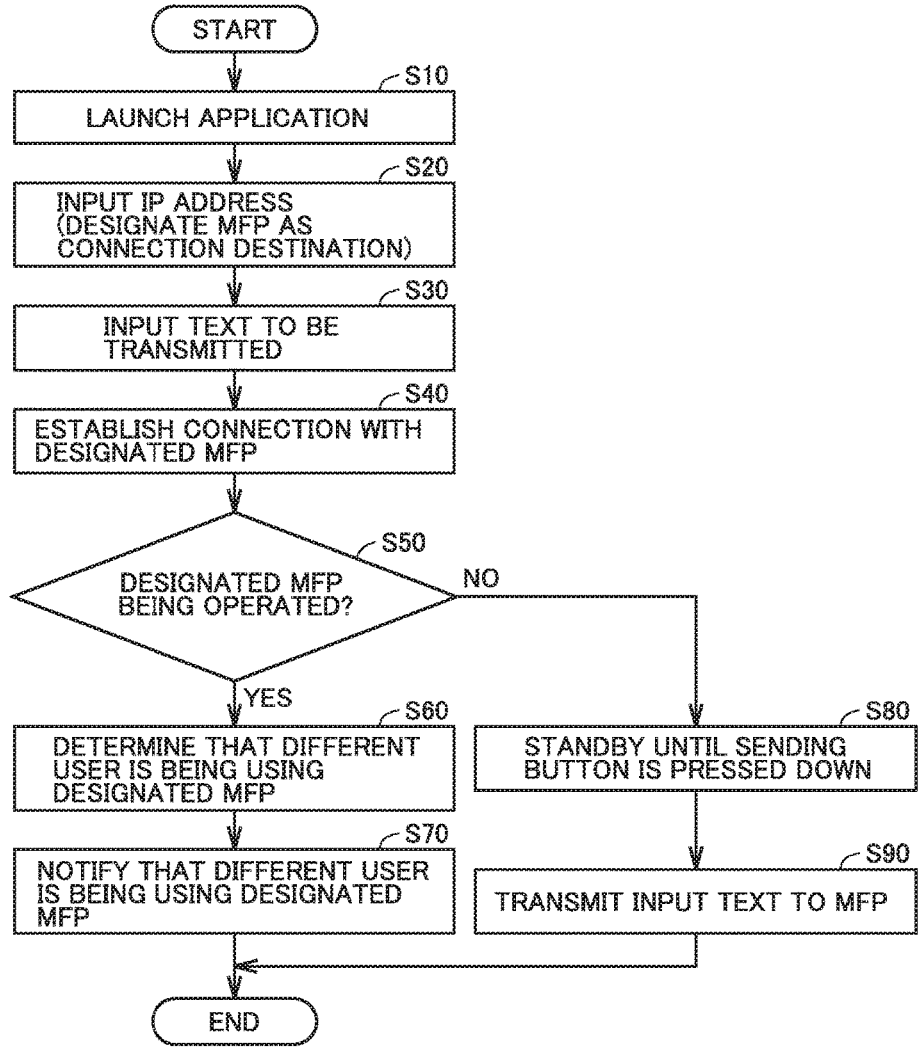
FIG. 12 shows one exemplary flowchart for the communication terminal to implement the process shown in FIG. 3.

FIG. 12 shows one exemplary flowchart for communication terminal 400 to implement the process shown in FIG. 3.

With reference to FIG. 12, when an operation is performed to present window 411 (FIG. 3, for example) in input device 405, CPU 401 launches, in a step S10, an application for presenting the window. Then, the control proceeds to a step S20.

In step S20, CPU 401 accepts input of information (IP address) to address input area 412 of window 411. This information is stored in storage device 403 as the IP address of the MFP for which connection was established previously, or is input via software keyboard 420, for example. Then, the control proceeds to a step S30.

In step S30, CPU 401 accepts input of information to information input area 413. This information is input via software keyboard 420, for example. Then, the control proceeds to a step S40.

In step S40, CPU 401 establishes connection with MFP 100 specified by the information (such as the IP address) input in address input area 412. Then, the control proceeds to a step S50. It should be noted that the control in step S40 may be performed in parallel with the acceptance of the input of information to information input area 413 in step S30.

In step S50, CPU 401 determines whether or not the designated MFP (MFP 100 connected in step S40) is being operated. When CPU 401 determines that MFP 100 is being operated, the control proceeds to a step S60. For example, when receiving the notification indicated as "OPERATION STATE NOTIFICATION" of FIG. 3 from MFP 100, CPU 401 determines that MFP 100 is being operated. On the other hand, when CPU 401 determines that MFP 100 is not being operated, the control proceeds to a step S80.

It should be noted that CPU 401 keeps the determination made in step S50, until the input of information to information input area 413 is ended. Accordingly, when even one "OPERATION STATE NOTIFICATION" of FIG. 3 is provided from MFP 100 to communication terminal 400 until it is determined that the input of information to information input area 413 is ended, the control proceeds to a step S60.

In step S60, CPU 401 determines that MFP 100 is being operated by a user different from the user who is operating communication terminal 400, and sets information (for example, flag) regarding this to RAM 402 or the like. Then, the control proceeds to a step S70. It should be noted that the control of step S60 may be omitted.

In step S70, in window 411, CPU 401 notifies that the different user (than the user who is operating communication terminal 400) is operating MFP 100, and ends the process of FIG. 12.

On the other hand, in step S80, CPU 401 waits until sending button 415 is operated. When sending button 415 is operated, the control proceeds to a step S90.

In step S90, CPU 401 transmits the information input in information input area 413 to MFP 100, and ends the process of FIG. 12.

In one embodiment described above, communication terminal 400 presents window 411 as shown in FIG. 1 and the like. The user inputs, to information input area 413 of window 411, information (such as text) to be transmitted to MFP 100. Communication terminal 400 inquires MFP 100 as to its operation state while information is being input into information input area 413. Then, when communication terminal 400 receives a notification indicating that MFP 100 is being operated, communication terminal 400 notifies it.

An image forming system according to one embodiment may include two or more MFPs. When an operation is performed in a certain MFP specified by address input area 412 while inputting information into information input area 413 (FIG. 1 or the like) of communication terminal 400, communication terminal 400 provides a notification to urge to perform short distance communication with another MFP. When the user of communication terminal 400 sees the notification, the user touch communication terminal 400 on another MFP for the purpose of short distance wireless communication with the other MFP. An example of the short distance wireless communication is communication in accordance with the NFC (Near Field Communication) standard.

Through the short distance wireless communication, communication terminal 400 obtains the IP address of the other MFP. Accordingly, communication terminal 400 transmits the information input in information input area 413 to the other MFP. It should be noted that in response to receiving, from communication terminal 400, the information input in information input area 413, the other MFP presents a screen for inputting the received information. Then, the other MFP presents the received information on the presented screen.

Figure 13:
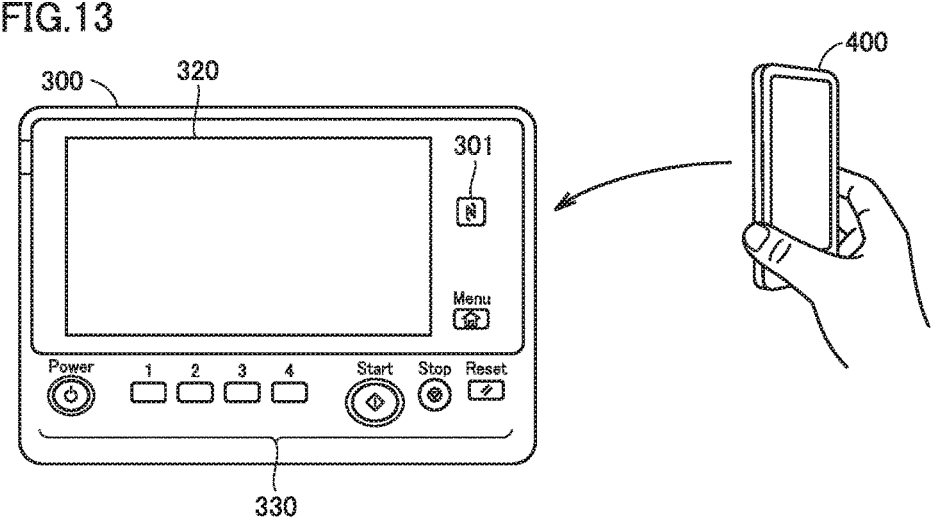
FIG. 13 schematically shows one exemplary manner of short distance wireless communication between an MFP and a communication terminal in one embodiment.
Figure 14:
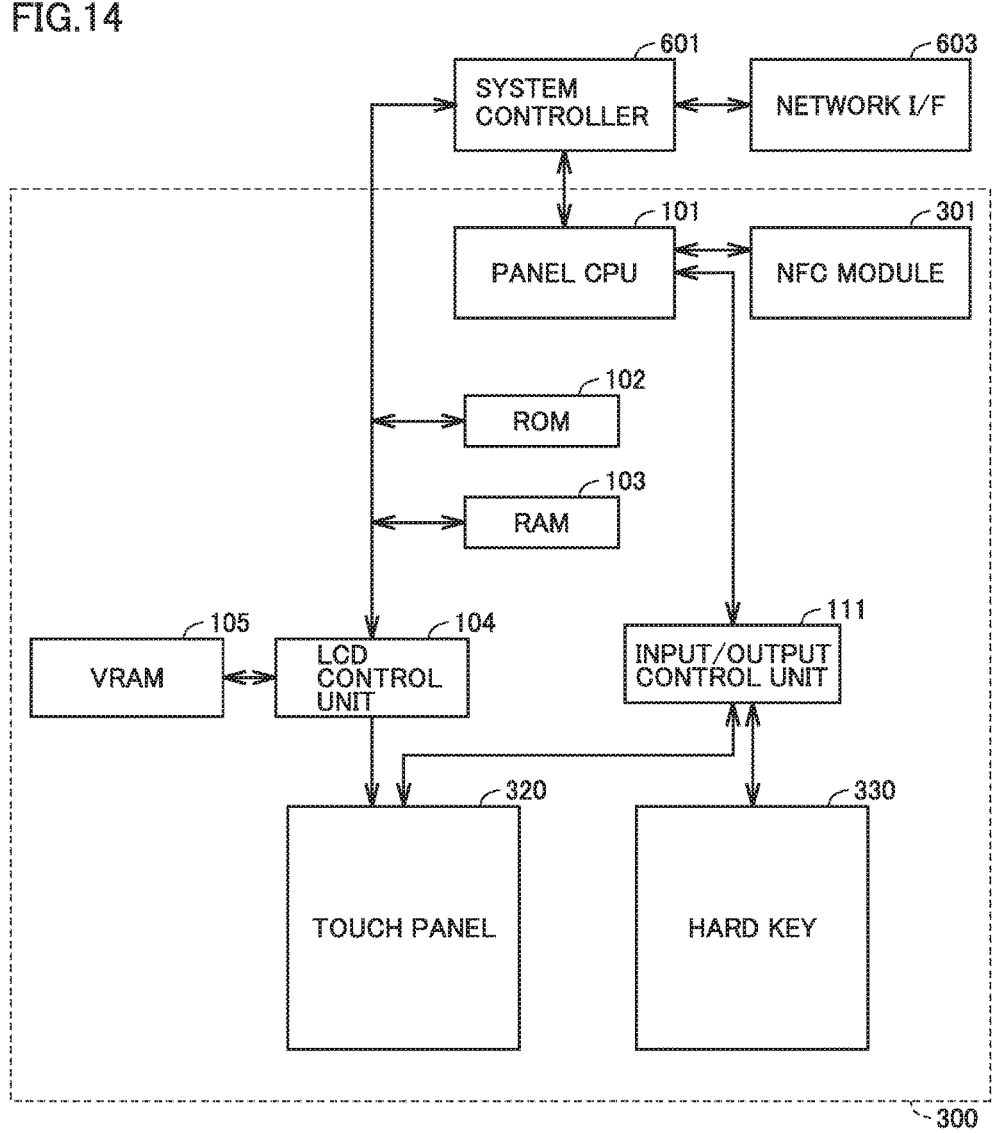
FIG. 14 shows a hardware configuration of the operation panel in the "other MFP" in one embodiment.
Figure 15:
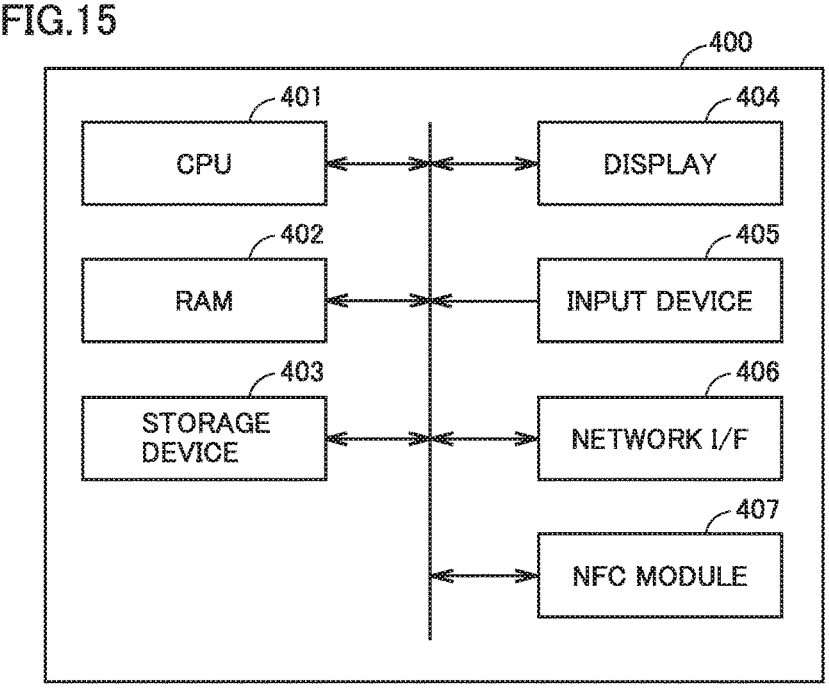
FIG. 15 shows a hardware configuration of the communication terminal in one embodiment.

FIG. 13 schematically shows one exemplary manner of the short distance wireless communication between the MFP and the communication terminal in one embodiment. FIG. 14 shows a hardware configuration of operation panel 300 in the "other MFP" in one embodiment. FIG. 15 shows a hardware configuration of communication terminal 400 in one embodiment.

As shown in FIG. 13 and FIG. 14, the "other MFP" includes an NFC module 301 in operation panel 300, in addition to network I/F 603 for connecting to a network such as a LAN. NFC module 301 is controlled by panel CPU 101. Moreover, as shown in FIG. 15, communication terminal 400 includes an NFC module 407 in addition to network I/F 406 for connecting to a network such as a LAN. NFC module 407 is controlled by CPU 401.

Figure 16:
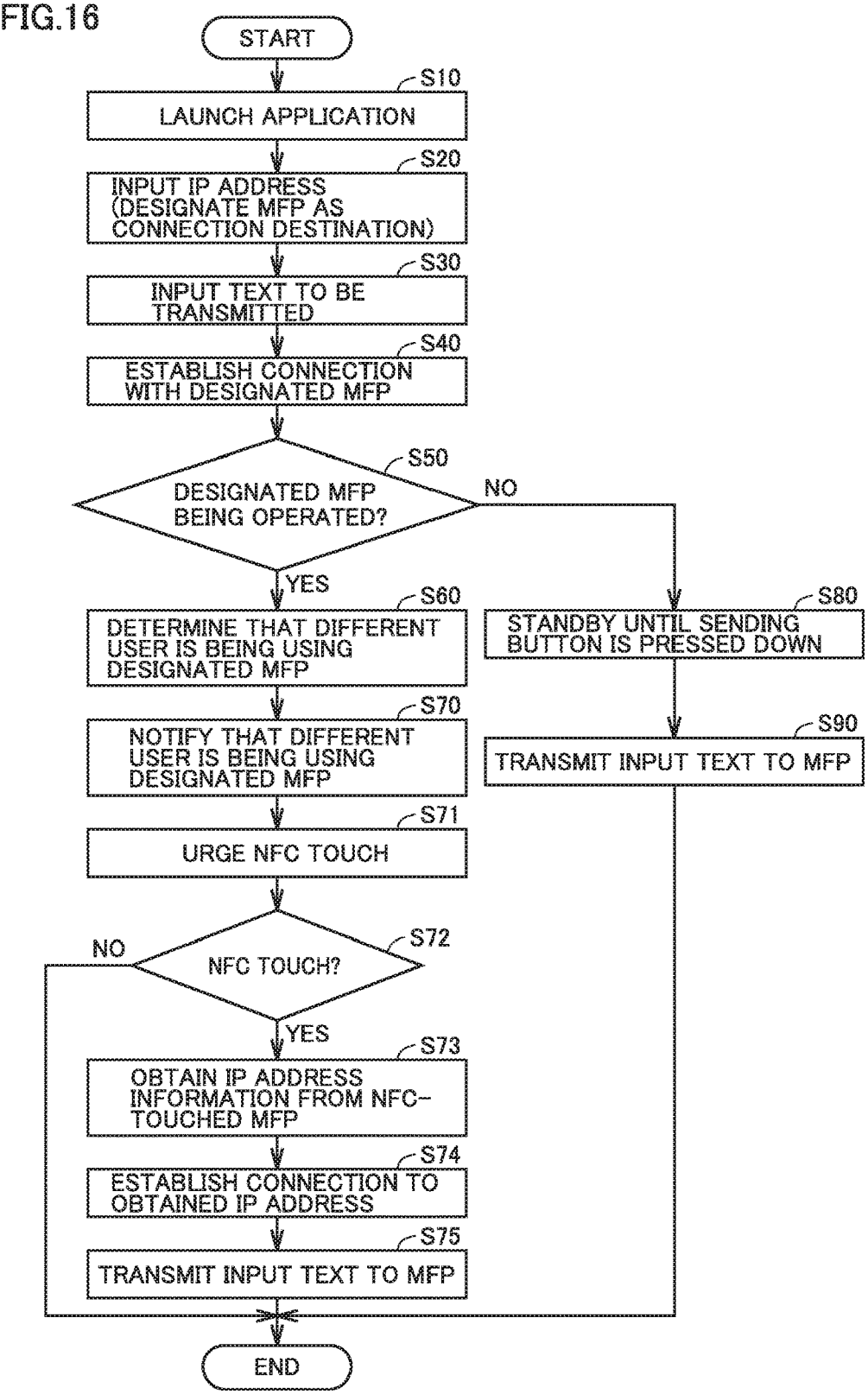
FIG. 16 is a flowchart of a process performed in the communication terminal in one embodiment.

FIG. 16 is a flowchart of a process performed in communication terminal 400 in one embodiment. The process of FIG. 16 corresponds to a modification of the process of FIG. 12.

As shown in FIG. 16, CPU 401 provides a notification ("confirmation presentation" in FIG. 3) in step S70, and then the control proceeds to a step S71.

In step S71, CPU 401 presents information to urge to bring communication terminal 400 into touch with an MFP different from MFP 100 with which connection has been established in step S40. Then, the control proceeds to a step S72.

[In step S72, CPU 401 determines whether or not the short distance wireless communication with the other MFP has been established through the touch with the other MFP. When CPU 401 determines that no touch to the other MFP has been made (no short distance wireless communication has been established), the process of FIG. 16 is ended. On the other hand, when CPU 401 determines that a touch to the other MFP has been made (short distance wireless communication has been established), the control proceeds to a step S73.

In step S73, CPU 401 obtains, from the MFP (other MFP) with which the short distance wireless communication is made, the IP address of the MFP. Then, the control proceeds to a step S74.

In step S74, CPU 401 establishes connection with MFP having the IP address obtained in step S73, via a network such as a LAN. Then, the control proceeds to a step S75.

In a step S75, under a condition that sending button 415 (FIG. 9 and the like) is operated, CPU 401 transmits, to the MFP with which the connection has been established in step S74, the information input in information input area 413, and ends the process of FIG. 16.

An image forming system 1 according to one embodiment may include a plurality of MFPs. Communication terminal 400 wirelessly communicates with each MFP. Communication terminal 400 presents respective operation states of the plurality of MFPs (whether or not their operation panels 300 are being operated).

Figure 17:
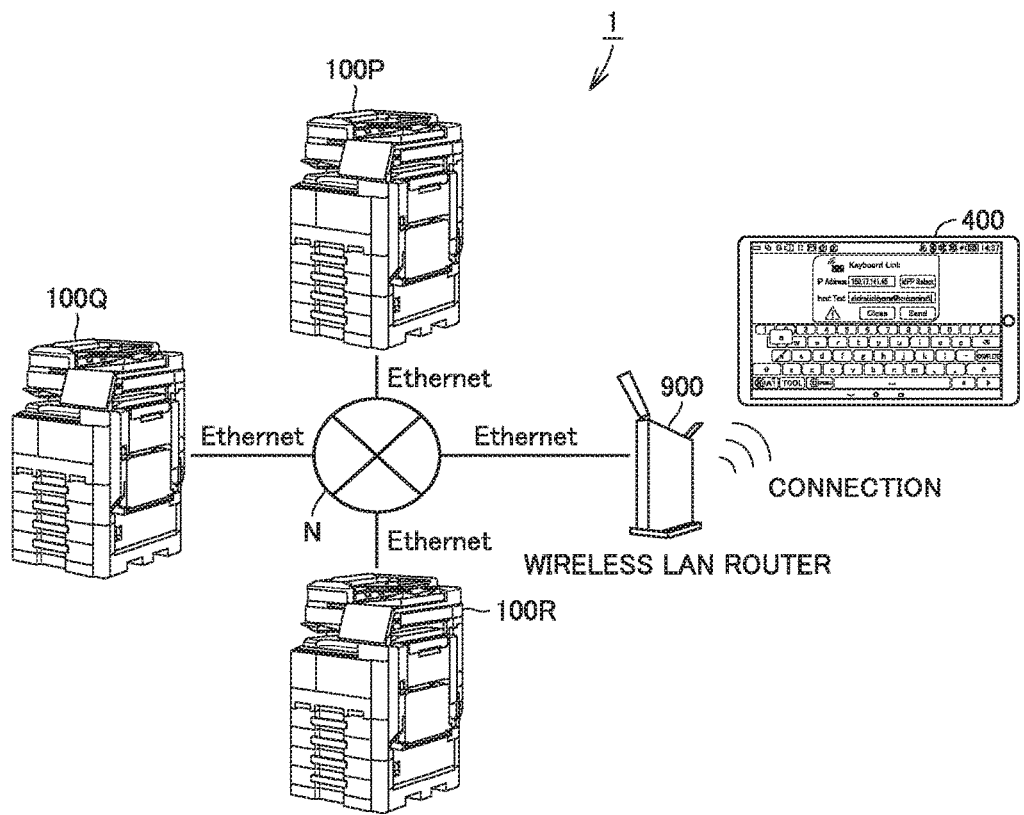
FIG. 17 shows one exemplary manner of communication between an MFP and a communication terminal in an image forming system 1 of one embodiment.

FIG. 17 shows one exemplary manner of communication between the MFP and communication terminal 400 in image forming system 1 of one embodiment. In the example shown in FIG. 17, image forming system 1 includes three MFP 100P, 100Q, 100R, communication terminal 400, and a LAN router 900. Each of MFPs 100P, 100Q, 100R is connected to a network N. Communication terminal 400 is connected to network N via LAN router 900.

Figure 18:
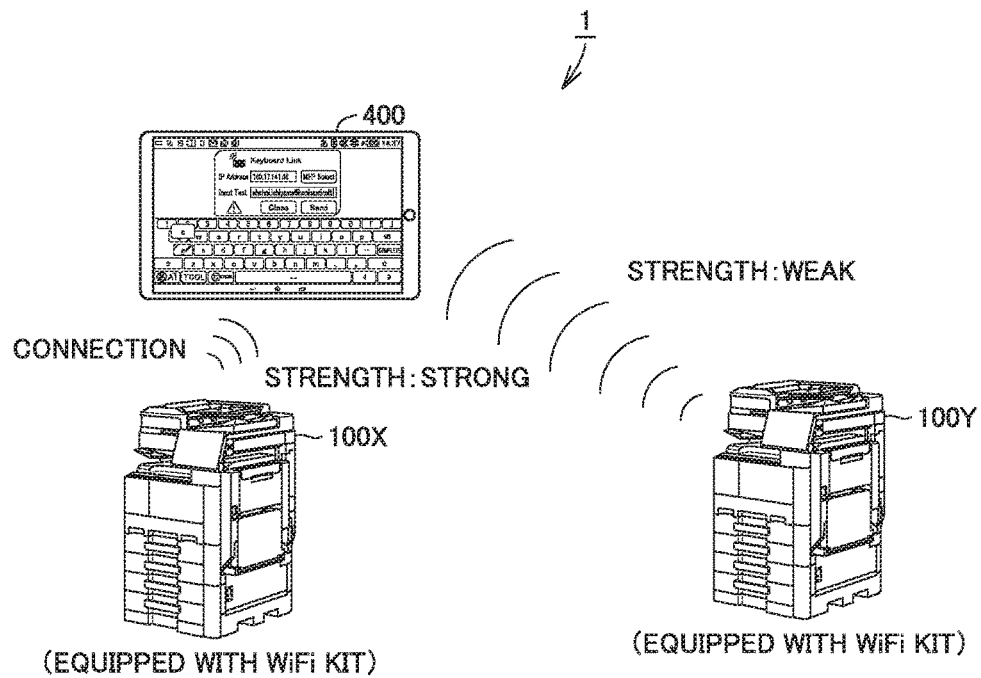
FIG. 18 shows another exemplary manner of communication between the MFP and the communication terminal in image forming system 1 of one embodiment.

FIG. 18 shows another exemplary manner of communication between the MFP and communication terminal 400 in image forming system 1 of one embodiment. In the example shown in FIG. 18, image forming system 1 includes two MFPs 100X, 100Y, and communication terminal 400. Communication terminal 400 wirelessly communicates with each of MFPs 100X, 100Y in a manner according to the WiFi standard.

Figure 19:
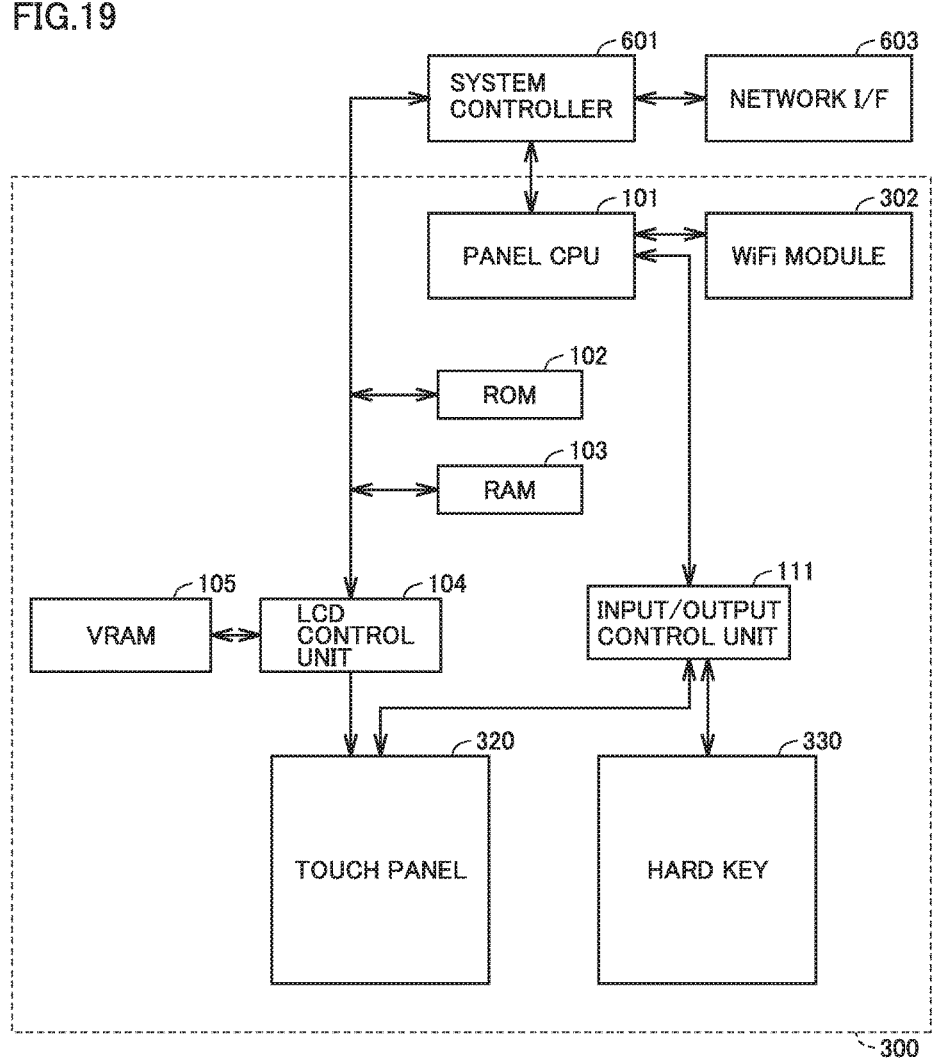
FIG. 19 shows a hardware configuration of the operation panel in the MFP in one embodiment.

FIG. 19 shows a hardware configuration of operation panel 300 of MFP 100 (MFP 100X or MFP 100Y of FIG. 18) in one embodiment. As shown in FIG. 19, MFP 100 includes a WiFi module 302 in operation panel 300, in addition to network I/F 603 for connecting to a network such as a LAN. WiFi module 302 is controlled by panel CPU 101.

Figure 20:
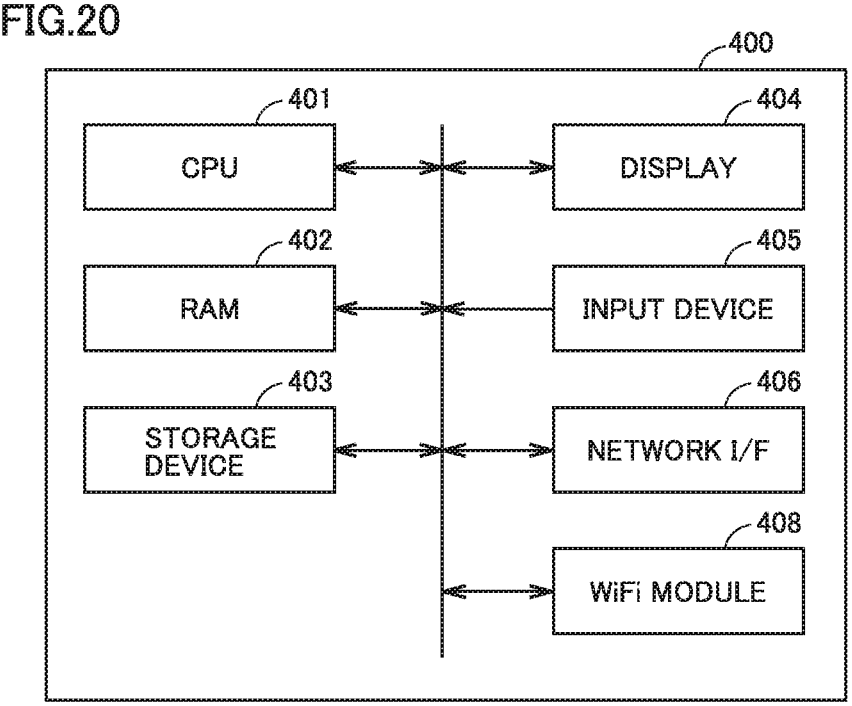
FIG. 20 shows a hardware configuration of the communication terminal in one embodiment.

FIG. 20 shows a hardware configuration of communication terminal 400 in one embodiment. Moreover, as shown in FIG. 20, communication terminal 400 includes a WiFi module 408 in addition to network I/F 406 for connecting to a network such as a LAN. WiFi module 408 is controlled by CPU 401.

FIG. 21 shows one exemplary manner of presentation of an operation state of each MFP in communication terminal 400. In the table shown in FIG. 21, information about four MFPs 100 (MFP_A, MFP_B, MFP_C, MFP_D) is shown. The "CURRENTLY OPERATED" of the item "OPERATION STATE" in the table indicates that operation panel 300 is being operated during the period of input of information to information input area 413 (FIG. 1 and the like) of communication terminal 400. Moreover, "-" indicates that no operation has been performed onto operation panel 300 yet during the period of input of the information to information input area 413 (FIG. 1 and the like) of communication terminal 400. The table of FIG. 21 indicates that three MFPs (MFP_A, MFP_C, MFP_D) of the four MFPs are being operated.

When the user of communication terminal 400 sees the table of FIG. 21, the user recognizes that MFP_B is a MFP 100 not operated by another user. Accordingly, the user of communication terminal 400 can transmit, to MFP_B, the information input in information input area 413.

Figure 22:
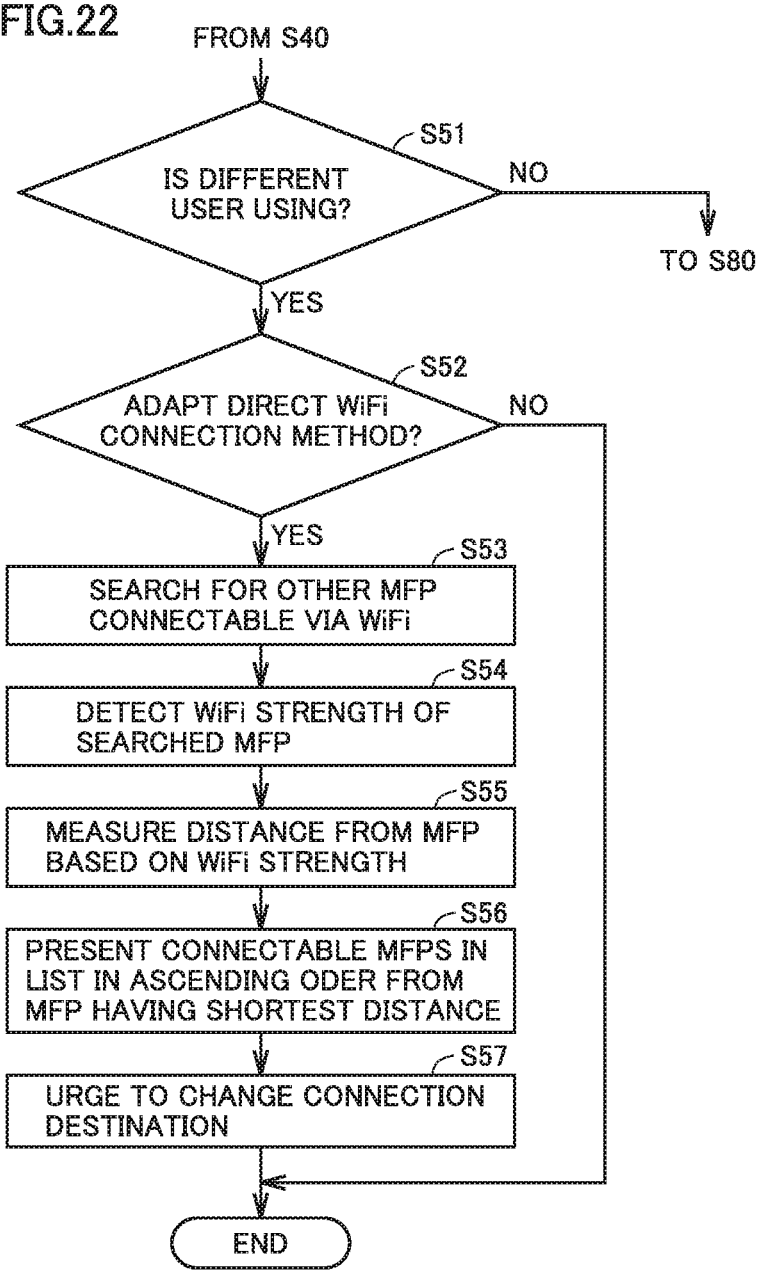
FIG. 22 is a flowchart of a process performed in the communication terminal in one embodiment.

In the table as shown in FIG. 21, the plurality of MFPs whose operation states are to be presented may be arranged in accordance with their distances from communication terminal 400. With reference to FIG. 22, the following describes a process performed in communication terminal 400 to present the table in accordance with the arrangement. FIG. 22 is a flowchart of a process performed in communication terminal 400 in one embodiment. As shown in FIG. 22, the process of FIG. 22 is performed after step S40 of FIG. 12.

After step S40, in a step S51, CPU 401 of communication terminal 400 determines whether or not MFP 100 designated in step S20 is being used by a user who is different from the user of communication terminal 400. One example of the determination in step S51 is based on such a premise that in the image forming system, each of communication terminal 400 and MFP 100 has a user authentication function. In this example, the determination in step S51 is performed by comparing (i) the ID of the user who has logged in to communication terminal 400 with (ii) the ID of the user who has logged in to MFP 100. When the user who uses MFP 100 is the same as the user who uses communication terminal 400, the control proceeds to a step S80 (FIG. 12). On the other hand, when the user who uses MFP 100 is different from the user who uses communication terminal 400, the control proceeds to a step S52.

In step S52, CPU 401 determines whether or not communication terminal 400 includes a WiFi module. When communication terminal 400 includes a WiFi module, the control proceeds to a step S53. On the other hand, when communication terminal 400 does not include a WiFi module, the process of FIG. 22 is ended.

In step S53, CPU 401 searches for an MFP capable of WiFi communication, among other MFPs (MFPs other than MFP 100 designated in step S20) in the image forming system. More specifically, CPU 401 specifies an MFP that emits WiFi electric wave. Then, the control proceeds to a step S54.

In step S54, CPU 401 detects the strength of the electric wave received from the other MFPs (MFPs other than MFP 100 designated in step S20) in the image forming system in the WiFi communication. Then, the control proceeds to a step S55.

In a step S55, based on the strength of the electric wave from each MFP as detected in step S54, CPU 401 determines a distance from communication terminal 400 to each of the MFPs. Then, the control proceeds to a step S56.

In step S56, on display 404, CPU 401 presents, in the form of the table of FIG. 19, a list in which MFPs from which the Wifi electric waves have been received in step S53 are arranged in an ascending order from one having the shortest distance determined in step S55, for example. Then, the control proceeds to a step S57.

It should be noted that CPU 401 transmits information to each of the MFPs in the list so as to request a notification that an operation has been performed onto operation panel 300 of each MFP. In response to this, when operation panel 300 is operated, each MFP notifies, to communication terminal 400, information indicating that operation panel 300 has been operated. In the list, CPU 401 displays, as "currently operated", the "operation state" of the MFP for which the notification is received.

In step S57, on display 404, CPU 401 presents information to urge to change the transmission destination of the information input in information input area 413 to an MFP in the list. The information presented here is preferably information for changing the transmission destination to an MFP whose "operation state" is not "currently operated" (MFP whose operation state is "-"). Then, the process of FIG. 22 is ended.

Figure 23:
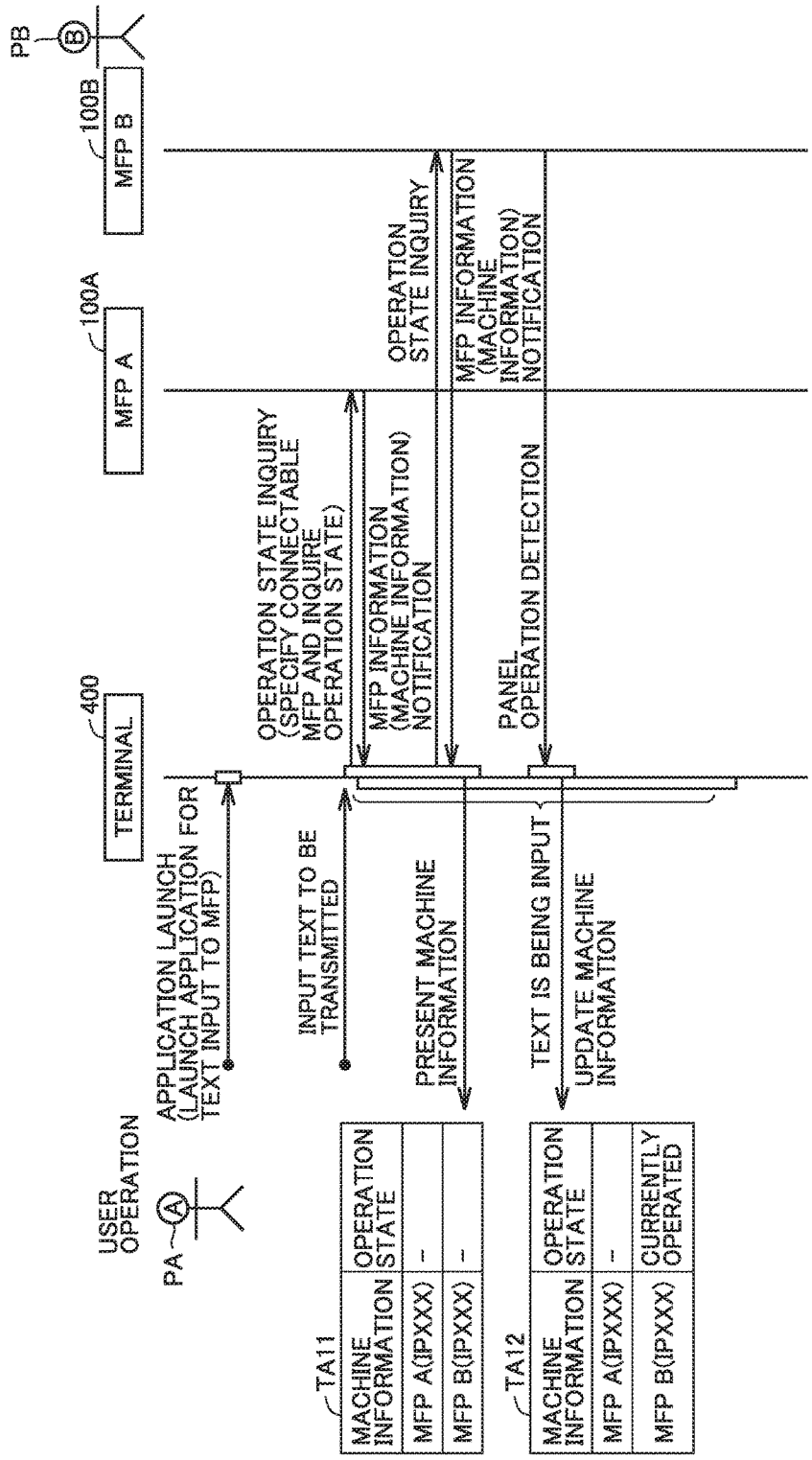
FIG. 23 is a sequence diagram showing an operation in the image forming system of one embodiment.

[Moreover, in the image forming system of one embodiment, during the period of input to information input area 413, communication terminal 400 may present a list of MFPs capable of WiFi communication, irrespective of the address input in address input area 412 or without presenting address input area 412. FIG. 23 is a sequence diagram showing an operation in the image forming system of one embodiment. In one embodiment, the process particularly shown in FIG. 22 will be described more in detail by the sequence of FIG. 23. It should be noted that for simplicity of description, in the sequence shown in FIG. 23, two MFPs (MFP 100A and MFP 100B) are shown as the MFP included in the image forming system.

First, communication terminal 400 launches an application for transmitting information (such as text) to the MFP ("APPLICATION LAUNCH" of FIG. 23).

Then, when the text to be transmitted to an MFP is started to be input in the application on communication terminal 400 ("INPUT TEXT TO BE TRANSMITTED" in FIG. 23), communication terminal 400 inquires each of the MFPs (MFP 100A and MFP 100B) to which communication terminal 400 can be connected, as to the state of the operation in each of the MFPs ("OPERATION STATE INQUIRY" of FIG. 23). The inquiry is performed in WiFi communication, for example.

Then, the application on communication terminal 400 presents a list of the operation states of the MFPs as shown in FIG. 21, for example ("MACHINE STATE PRESENTATION" of FIG. 23). In FIG. 23, one example of the list presented is indicated as a table TA11.

When an operation is performed onto operation panel 300 of each MFP, each of the MFPs notifies the application that an operation is performed onto operation panel 300 of each MFP ("PANEL OPERATION DETECTION" of FIG. 23).

When the notification is received, the application updates the list presentation of the operation state of the MFP (see FIG. 21 and the like) ("MACHINE STATE UPDATE" in FIG. 23). In FIG. 23, one example of the list after updating is shown as a table TA12.

In one embodiment described above, the pieces of information about the plurality of MFPs are presented in the list to urge to change the transmission destination to an MFP in the list. The list is updated in accordance with a predetermined condition. An example of the predetermined condition is a notification indicating an operation state of an MFP and sent from the MFP. Another example thereof is passage of certain time. The application of communication terminal 400 may update the presentation of the list in response to (i) providing an inquiry to each MFP as to the operation state thereof whenever certain time passes and then (ii) obtaining a reply of the inquiry from the MFP.

Figure 24:
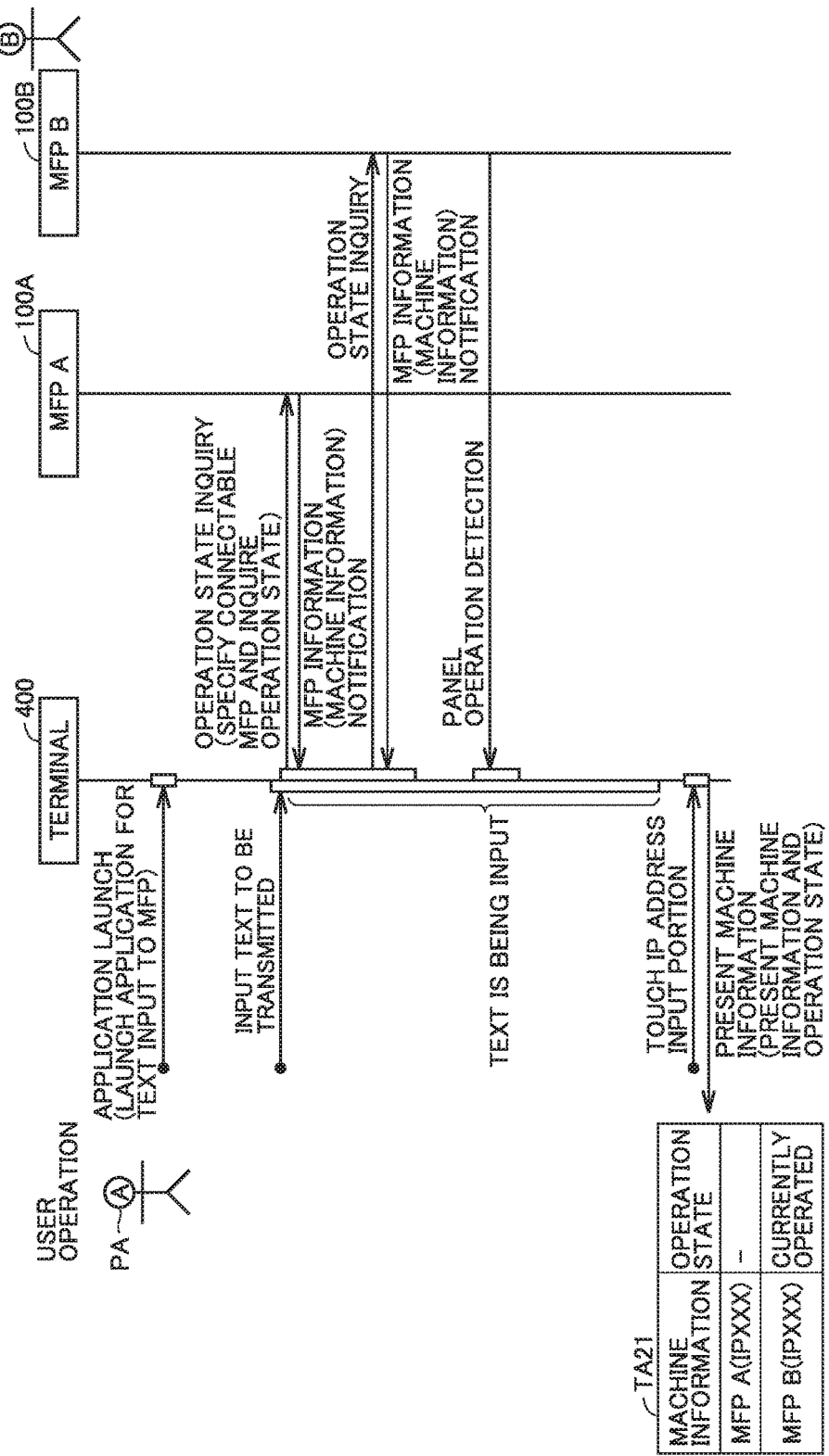
FIG. 24 shows an exemplary sequence of communication between a communication terminal and an MFP in an image forming system of one embodiment.

FIG. 24 shows an exemplary sequence of communication between the communication terminal and the MFP in the image forming system of one embodiment. In comparison with the sequence of FIG. 23, the sequence of FIG. 24 includes a step "TOUCH IP ADDRESS INPUT PORTION" performed by the application of communication terminal 400. In this step, the application of communication terminal 400 accepts the user's operation of touching address input area 412 (FIG. 1 and the like).

Then, the application presents respective operation states of MFPs in a list in response to accepting the operation ("MACHINE STATE PRESENTATION" of FIG. 24). In FIG. 24, the list presented in this step is shown as a table TA21.

In one embodiment, during a period of (i) time at which the application of communication terminal 400 transmits the inquiry of the operation state to each MFP ("OPERATION STATE INQUIRY" of FIG. 24) to (ii) time at which address input area 412 is touched, a notification from each MFP (notification indicating that operation panel 300 has been operated) is received. Then, the application of communication terminal 400 reflects the reception of such a notification in the list presented in the step of "MACHINE STATE PRESENTATION". In other words, in the list, the application presents, together with a text string "CURRENTLY OPERATED", the machine name of the MFP from which the notification has been received.

In one embodiment described above, the application of communication terminal 400 presents the operation state of each MFP when address input area 412 is operated after inquiring each MFP as to the operation state thereof.

FIG. 25 shows one exemplary sequence of communication between the communication terminal and the MFP in the image forming system of one embodiment. As compared with the sequence of FIG. 24, the sequence of FIG. 25 includes a step "PRESS DOWN MACHINE INFORMATION PRESENTATION BUTTON" instead of the step "TOUCH IP ADDRESS INPUT PORTION".

In one embodiment, on display 404, communication terminal 400 presents a button exclusively used to check an operation state of an MFP on the network. In the step "PRESS DOWN MACHINE INFORMATION PRESENTATION BUTTON", the application on communication terminal 400 accepts an operation onto the exclusively used button. Then, in response to accepting the operation, the application presents operation states of the MFPs in a list ("MACHINE STATE PRESENTATION" in FIG. 25). In FIG. 25, the list presented in this step is shown as a table TA31.

In communication terminal 400, information is stored which associates (i) the names of the MFPs presented in table TA31 ("MFP_A (IPXXX)" and "MFP_B (IPXXX)") with (ii) the IP addresses of corresponding MFPs. For example, the information is the IP address of each MFP as obtained by communication terminal 400 as a result of the WiFi communication with each MFP.

Then, in the sequence of FIG. 25, an operation of touching the name of a MFP in the list is accepted. The acceptance of the operation corresponds to a step "INPUT IP ADDRESS OF MFP SELECTED IN LIST" and a step "INSTRUCT TO TEXT TRANSMISSION" in the sequence of FIG. 25. Then, in response to the operation, the application of communication terminal 400 reads the IP address of the MFP associated with the name onto which the operation has been made, and transmits, to the IP address, the information (such as text) input in information input area 413 (see FIG. 1) ("TEXT TRANSMISSION" in FIG. 25).

In one embodiment described above, the user of communication terminal 400 can recognize the operation state of each MFP on the network through the presentation of the list. Further, by touching the name of the MFP in the list, the user can transmits, to the MFP whose name has been touched, the information input in information input area 413.

According to the present disclosure, when it is detected in the communication terminal that information to be transmitted to the image forming apparatus is input and the image forming apparatus is being operated, a notification is provided in the communication terminal. A fact that the image forming apparatus is being operated while the information is being input in the communication terminal indicates that the image forming apparatus is highly likely to be operated by a user different from the user who is inputting the information to the communication terminal.

Therefore, according to the present disclosure, the user of the communication terminal is notified that the image forming apparatus is highly likely to be operated by another user. Accordingly, the user can appropriately check whether to transmit upon transmitting information from the communication terminal to the image forming apparatus.

It should be noted that according to the present disclosure, the notification from the communication terminal is not performed before the information is input, but is performed while the information is being input. Accordingly, an unnecessary notification can be avoided when the user of the communication terminal does not intend to transmit information to the image forming apparatus.

Moreover, according to the present disclosure, the notification from the communication terminal is performed before the information is transmitted. Accordingly, the user of the communication terminal can check the user of the image forming apparatus before transmitting the information to the image forming apparatus.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. An image forming system comprising a first image forming apparatus, a second image forming apparatus, and a communication terminal,
the communication terminal including:
a first input device configured to accept input of (i) information for specifying the image forming apparatus and (ii) information to be transmitted to the image forming apparatus;
a first network interface configured to communicate with the first and second image forming apparatus; and
a first processor configured to control operations of the first input device and the first network interface, the first processor being configured to connect the communication terminal to the first image forming apparatus via the first network interface when the first processor detects that the information to be transmitted to the image forming apparatus is being input into the first input device, the first image forming apparatus including:
  a second input device configured to accept an operation of inputting information to the first image forming apparatus;
  a second network interface configured to communicate with the communication terminal; and
  a second processor configured to control operations of the second input device and the second network interface, the second image forming apparatus including a third network interface configured to communicate with the communication terminal, when the second processor detects that an operation is being performed onto the second input device while the first image forming apparatus is connected to the communication terminal, the second processor being configured to perform a first notification to notify the communication terminal that the operation is being performed onto the second input device, when the first notification is performed by the first image forming apparatus, the first processor being configured to perform a second notification corresponding to the first notification in the communication terminal, the second notification urging to change a connection destination of the first network interface to the second image forming apparatus.

2. The image forming system according to claim 1, further comprising another image forming apparatus, wherein
  the communication terminal includes a first proximity network interface,
  the another image forming apparatus includes a second proximity network interface,
  the second notification in the communication terminal includes a notification for urging proximity communication with the another image forming apparatus,
  the another image forming apparatus further includes a third processor configured to transmit, via the second proximity network interface, information for specifying the another image forming apparatus, and
  the first processor is configured to
    obtain information for specifying the another image forming apparatus via the first proximity network interface, and
    connect the communication terminal to the another image forming apparatus using the information for specifying the another image forming apparatus.

3. The image forming system according to claim 1, further comprising another image forming apparatus, wherein
  the communication terminal includes a first wireless network interface configured to wirelessly communicate with the another image forming apparatus,
  the another image forming apparatus includes a second wireless network interface configured to wirelessly communicate with the communication terminal, and
  when the first notification is received, the first processor is configured to perform, as the second notification, a notification to urge to change a connection destination of the first network interface to the another image forming apparatus when wireless communication with the another image forming apparatus is able to be performed.

4. The image forming system according to claim 1, wherein the first processor is configured to perform the second notification under a condition that a user who is inputting the information into the first input device is different from a user who is inputting the information into the second input device.

5. The image forming system according to claim 2, wherein the first processor is configured to perform the second notification under a condition that a user who is inputting the information into the first input device is different from a user who is inputting the information into the second input device.

6. The image forming system according to claim 3, wherein
  the first processor is configured to perform the second notification under a condition that a user who is inputting the information into the first input device is different from a user who is inputting the information into the second input device.

7. The image forming system according to claim 1, further comprising another image forming apparatus, wherein
  the another image forming apparatus includes a third input device configured to accept an operation of inputting information to the another image forming apparatus,
  when information to be transmitted to the image forming apparatus is being input in the first input device, the first processor is configured to present whether or not the third input device of the another image forming apparatus is being operated, under a condition that the communication terminal is able to be connected to the another image forming apparatus.

8. The image forming system according to claim 1, further comprising another image forming apparatus, wherein
  the another image forming apparatus includes a third input device configured to accept an operation of inputting information to the another image forming apparatus, and
  when information for specifying the image forming apparatus is being input in the first input device, the first processor is configured to present whether or not the third input device of the another image forming apparatus is being operated, under a condition that the communication terminal is able to be connected to the another image forming apparatus.

9. The image forming system according to claim 1, further comprising another image forming apparatus, wherein
  the another image forming apparatus includes a third input device configured to accept an operation of inputting information to the another image forming apparatus,
  the communication terminal includes a specific operation device, and
  in response to the specific operation device being operated, the first processor is configured to present whether or not the third input device of the another image forming apparatus is being operated, under a condition that the communication terminal is able to be connected to the another image forming apparatus.

10. The image forming system according to claim 7, wherein the first processor is configured to update, in accordance with a predetermined condition, a result as to whether or not the third input device of the another image forming apparatus is being operated.

11. The image forming system according to claim 8, wherein the first processor is configured to update, in accordance with a predetermined condition, a result as to whether or not the third input device of the another image forming apparatus is being operated.

12. The image forming system according to claim 9, wherein the first processor is configured to update, in accordance with a predetermined condition, a result as to whether or not the third input device of the another image forming apparatus is being operated.

13. The image forming system according to claim 7, wherein
the first input device is configured to accept input of information for designating the another image forming apparatus, and
the first processor is configured to connect the communication terminal to the designated another image forming apparatus and transmit, to the another image forming apparatus, information that is input into the first input device and that is to be transmitted to the image forming apparatus.

14. The image forming system according to claim 8, wherein
the first input device is configured to accept input of information for designating the another image forming apparatus, and
the first processor is configured to connect the communication terminal to the designated another image forming apparatus and transmit, to the another image forming apparatus, information that is input into the first input device and that is to be transmitted to the image forming apparatus.

15. The image forming system according to claim 9, wherein
the first input device is configured to accept input of information for designating the another image forming apparatus, and
the first processor is configured to connect the communication terminal to the designated another image forming apparatus and transmit, to the another image forming apparatus, information that is input into the first input device and that is to be transmitted to the image forming apparatus.

16. The image forming system according to claim 10, wherein
the first input device is configured to accept input of information for designating the another image forming apparatus, and
the first processor is configured to connect the communication terminal to the designated another image forming apparatus and transmit, to the another image forming apparatus, information that is input into the first input device and that is to be transmitted to the image forming apparatus.

17. A communication terminal capable of communicating with a first image forming apparatus, a second image forming apparatus, the communication terminal comprising:
a first input device configured to accept input of (i) information for specifying the image forming apparatus and (ii) information to be transmitted to the image forming apparatus;
a first network interface configured to communicate with the first image forming apparatus and the second image forming apparatus; and
a first processor configured to control operations of the first input device and the first network interface, the first processor being configured to connect the communication terminal to the first image forming apparatus via the first network interface when the processor detects that the information to be transmitted to the image forming apparatus is being input into the first input device,
wherein the first image forming apparatus includes:
a second input device configured to accept an operation of inputting information to the first image forming apparatus;
a second network interface configured to communicate with the communication terminal; and
a second processor configured to control operations of the second input device and the second network interface,
wherein the second image forming apparatus includes a third network interface configured to communicate with the communication terminal, and
when the second processor detects an operation is being performed on the second input device while the first image forming apparatus is connected to the communication terminal, the second processor is configured to perform a first notification to notify the communication terminal that the operation is being performed onto the second input device, and
when the first notification is performed by the first image forming apparatus, the first processor is configured to perform a second notification corresponding to the first notification in the communication terminal, the second notification urging to change a connection destination of the first network interface to the second image forming apparatus.

18. A non-transitory computer-readable storage medium storing a program, the program causing one or more processors of an communication terminal to perform a communication method comprising:
accepting, at a first input device of the communication terminal, an input of information to be transmitted to a first image forming apparatus and information for specifying the first image forming apparatus;
detecting that the information to be transmitted to the first image forming apparatus is being input;
connecting the communication terminal to the first image forming apparatus via a first network interface when it is detected that the information to be transmitted to the image forming apparatus is being input to the first input device, the first network interface being configured to communicate with the first image forming apparatus and a second image forming apparatus;
upon detecting an operation being performed on a second input device of the first image forming apparatus while the first image forming apparatus is connected to the communication terminal, wherein the second input device is configured to accept an operation of inputting information to the first image forming apparatus:
performing a first notification that the operation is being performed on the second input device; and
performing a second notification urging to change a connection destination of the first network interface to the second image forming apparatus.

* * * * *